US012447743B2

(12) United States Patent
Menzel et al.

(10) Patent No.: US 12,447,743 B2
(45) Date of Patent: Oct. 21, 2025

(54) FLUID EJECTION DEVICES

(71) Applicant: FUJIFILM Dimatix, Inc., Lebanon, NH (US)

(72) Inventors: Christoph Menzel, New London, NH (US); Darren T. Imai, Los Gatos, CA (US)

(73) Assignee: FUJIFILM Dimatix, Inc., Lebanon, NH (US)

(*) Notice: Subject to any disclaimer, the term of this patent is extended or adjusted under 35 U.S.C. 154(b) by 63 days.

(21) Appl. No.: 18/423,505

(22) Filed: Jan. 26, 2024

(65) Prior Publication Data

US 2024/0157699 A1 May 16, 2024

Related U.S. Application Data

(60) Division of application No. 17/242,621, filed on Apr. 28, 2021, now Pat. No. 11,904,610, which is a (Continued)

(51) Int. Cl.
*B41J 2/14* (2006.01)
*B41J 2/16* (2006.01)

(52) U.S. Cl.
CPC ....... *B41J 2/14209* (2013.01); *B41J 2/14233* (2013.01); *B41J 2/161* (2013.01); (Continued)

(58) Field of Classification Search
CPC ................ B41J 2/14209; B41J 2/14233; B41J 2002/14459; B41J 2/14
See application file for complete search history.

(56) References Cited

U.S. PATENT DOCUMENTS 3,958,255 A 5/1976 Chiou et al.
5,828,394 A 10/1998 Khuri-Yakub
(Continued)

FOREIGN PATENT DOCUMENTS

CN 1172733 2/1998
CN 1678460 10/2005
(Continued)

OTHER PUBLICATIONS

EPO Communication pursuant to Article 94(3) issued in European Application No. 16882747.5 on Apr. 13, 2021, 6 pages.
(Continued)

*Primary Examiner* — Sharon Polk
(74) *Attorney, Agent, or Firm* — Fish & Richardson P.C.

(57) ABSTRACT

A fluid ejector includes a nozzle layer, a body, an actuator and a membrane. The body includes a pumping chamber, a return channel, and a first passage fluidically connecting the pumping chamber to an entrance of the nozzle. A second passage fluidically connects the entrance of the nozzle to the return channel. The actuator is configured to cause fluid to flow out of the pumping chamber such that actuation of the actuator causes fluid to be ejected from the nozzle. The membrane is formed across and partially blocks at least one of the first passage, the second passage or the entrance of the nozzle. The membrane has at least one hole therethrough such that in operation of the fluid ejector fluid flows through the at least one hole in the membrane.

15 Claims, 31 Drawing Sheets

Form openings

Related U.S. Application Data division of application No. 16/394,073, filed on Apr. 25, 2019, now Pat. No. 11,001,059, which is a continuation of application No. 15/395,549, filed on Dec. 30, 2016, now Pat. No. 10,315,421.

(60) Provisional application No. 62/273,891, filed on Dec. 31, 2015.

(52) U.S. Cl.
CPC ........... *B41J 2/1623* (2013.01); *B41J 2/1628* (2013.01); *B41J 2/1629* (2013.01); *B41J 2/1631* (2013.01); *B41J 2/1632* (2013.01); *B41J 2002/14403* (2013.01); *B41J 2002/14459* (2013.01); *B41J 2202/12* (2013.01)

(56) References Cited

U.S. PATENT DOCUMENTS

| | | | |
|---|---|---|---|
| 6,183,068 B1 | 2/2001 | Kashino et al. | |
| 7,566,118 B2 | 7/2009 | Bibl et al. | |
| 2010/0039479 A1 | 2/2010 | Bibl et al. | |
| 2010/0118075 A1 | 5/2010 | Miyazawa et al. | |
| 2010/0220148 A1 | 9/2010 | Menzel et al. | |
| 2011/0007117 A1* | 1/2011 | Bibl | B05B 12/04 347/70 |
| 2011/0109694 A1 | 5/2011 | Chen et al. | |
| 2011/0148988 A1 | 6/2011 | Hoisington et al. | |
| 2011/0228011 A1 | 9/2011 | Kyoso et al. | |
| 2011/0261118 A1 | 10/2011 | Baumer et al. | |
| 2012/0098899 A1 | 4/2012 | Xie et al. | |
| 2014/0078224 A1 | 3/2014 | Park et al. | |
| 2014/0160200 A1 | 6/2014 | Kim et al. | |
| 2014/0307036 A1 | 10/2014 | Xie et al. | |
| 2015/0085021 A1 | 3/2015 | Govyadinov et al. | |
| 2019/0248138 A1 | 8/2019 | Menzel et al. | |
| 2021/0245508 A1 | 8/2021 | Menzel et al. | |

FOREIGN PATENT DOCUMENTS

| | | |
|---|---|---|
| CN | 101121319 | 2/2008 |
| CN | 102026813 | 4/2011 |
| CN | 102218909 | 10/2011 |
| CN | 104169090 | 11/2014 |
| CN | 105109207 | 12/2015 |
| JP | H 03065352 | 3/1991 |
| JP | H 04211962 | 8/1992 |
| JP | 2005532199 | 10/2005 |
| JP | 2008290292 | 12/2008 |
| JP | 2011520671 | 7/2011 |
| JP | 2013116590 | 6/2013 |
| JP | 2014061695 | 4/2014 |
| JP | 2014117947 | 6/2014 |
| WO | WO 2005037558 | 4/2005 |

OTHER PUBLICATIONS

EPO Communication pursuant to Article 94(3) issued in European Application No. 16882747.5 on Jun. 23, 2020, 7 pages.
Extended European Search Report issued in European Application No. 16882747.5 on Jul. 12, 2019, 10 pages.
Office Action in Japanese Appln. No. 2021-079130, dated Apr. 5, 2023, 5 pages (with English translation).
Office Action in Japanese Appln. No. 2021-079130, dated May 18, 2022, 8 pages (with English translation).
Office Action in Japanese Appln. No. 2021-079130, dated Oct. 5, 2022, 7 pages (with English translation).
Office Action issued in Chinese Application No. 201680082235.7 on Jun. 28, 2020, 7 pages (with English translation).
Office Action issued in Chinese Application No. 201680082235.7 on Sep. 4, 2019, 15 pages (with English translation).
Office Action issued in Chinese Application No. 202110060536.2 on Jan. 28, 2022, 17 pages (with English Translation).
Office Action issued in Japanese Application No. 2018-533915 on Apr. 7, 2021, 5 pages (with English translation).
Office Action issued in Japanese Application No. 2018-533915 on Sep. 16, 2020, 12 pages (with English translation).
PCT International Search Report and Written Opinion of the International Searching Authority, PCT/US2016/069462, Apr. 14, 2017, 31 pages.

* cited by examiner

Flip 86 upside down and attach to 80

Remove handle

Form compliance structure and/or holes in membrane

Attach substrate with flow channels

Remove handle

Flip 86 upside down and attach to 80

Remove handle layer

Form openings

Attach substrate with flow channels

Remove handle

Flip 86 upside down and attach to 80

Remove handle layer

Form openings

Flip 86 upside down and attach to 80

Remove handle layer 92

Etch through 90 to form location of nozzle, impedance structure for "leak", and aperture into return channel Attach substrate with flow channels Remove support substrate Filter/impedance structure in the return path Flip 86 upside down and attach to 80

Remove Handle layer

Etch through 90 to form location of nozzle, impedance structure for "leak", and aperture into return channel Attach substrate with flow channels Filter/impedance structure in the return path

FLUID EJECTION DEVICES

CROSS-REFERENCE TO RELATED APPLICATIONS

Pursuant to 35 USC § 120, this application is a divisional of and claims priority under 35 U.S.C. § 120 to U.S. patent application Ser. No. 17/242,621, filed on Apr. 28, 2021, which is a divisional of U.S. patent application Ser. No. 16/394,073, filed on Apr. 25, 2019, now U.S. Pat. No. 11,001,059, which is a continuation of U.S. patent application Ser. No. 15/395,549, filed on Dec. 30, 2016, now U.S. Pat. No. 10,315,421, which in turn claims the benefit of U.S. Provisional Application Ser. No. 62/273,891, filed Dec. 31, 2015. The entire contents of each of these priority applications are incorporated herein by reference.

TECHNICAL FIELD

The present disclosure relates generally to fluid ejection devices.

BACKGROUND

In some fluid ejection devices, fluid droplets are ejected from one or more nozzles onto a medium. The nozzles are fluidically connected to a fluid path that includes a fluid pumping chamber. The fluid pumping chamber can be actuated by an actuator, which causes ejection of a fluid droplet. The medium can be moved relative to the fluid ejection device. The ejection of a fluid droplet from a particular nozzle is timed with the movement of the medium to place a fluid droplet at a desired location on the medium. Ejecting fluid droplets of uniform size and speed and in the same direction enables uniform deposition of fluid droplets onto the medium.

SUMMARY

When fluid is ejected from a nozzle of a fluid ejector, the nozzle can become at least partially depleted of fluid, rendering the nozzle unprepared for ejection of further droplets. Circulation of fluid through “leakage” flow paths to the nozzle can refill the depleted nozzle. If these leakage flow paths have a large cross-sectional area, the depleted nozzle can be refilled quickly after fluid is ejected from the nozzle, the nozzle can be readied more quickly for subsequent fluid ejections. However, large leakage flow paths can make it difficult to achieve a high enough pressure at the nozzle opening for efficient fluid ejection. In order to achieve both rapid nozzle refilling and sufficiently high nozzle pressure, an impedance feature can be positioned in the flow path. The impedance feature introduces a fluidic impedance into the leakage flow path that is higher at or around the jet resonance frequency than at other frequencies. The jet resonance frequency is the frequency at which the nozzle has high fluid flow, such as during fluid ejection from the nozzle. As a result of the higher fluidic impedance introduced by the impedance feature at the jet resonance frequency, the fluidic impedance in the flow paths is higher during fluid ejection than at other times, e.g., during refilling, thus enabling sufficiently high pressures to be achieved during ejection and while still providing rapid refilling of the depleted nozzle when no fluid is being ejected. The impedance feature can be a membrane with apertures positioned in the fluid supply or return path.

Another issue is that fluid can contain contaminants, e.g., impurities, that can clog or damage a nozzle. It is useful to have a filter to prevent such contaminants from reaching the nozzle or from being ejected onto the surface. The impedance feature can be a membrane with apertures positioned in the fluid supply path.

In a first aspect, a fluid ejector includes a nozzle layer, a body, an actuator and a membrane. The nozzle layer has an outer surface, an inner surface, and a nozzle extending between the inner surface and the outer surface. The nozzle has an entrance at the inner surface to receive fluid and an exit opening at an outer surface for ejection of fluid. The inner surface of the nozzle layer is secured to the body. The body includes a pumping chamber, a return channel, and a first passage fluidically connecting the pumping chamber to the entrance of the nozzle. A second passage fluidically connects the entrance of the nozzle to the return channel. The actuator is configured to cause fluid to flow out of the pumping chamber such that actuation of the actuator causes fluid to be ejected from the nozzle. The membrane is formed across and partially blocks at least one of the first passage, the second passage or the entrance of the nozzle. The membrane has at least one hole therethrough such that in operation of the fluid ejector fluid flows through the at least one hole in the membrane.

Implementations may include one or more of the following features.

The membrane and hole may be configured such that the first flow path has a first impedance when fluid is being ejected from the nozzle and a second impedance when fluid is not being ejected from the nozzle. The first impedance may be greater than the second impedance. The membrane may be configured such that second passage has a maximum impedance at or around a resonance frequency of the nozzle.

The membrane may extend substantially parallel to the outer surface.

The membrane may be formed across the second passage. The second passage may include a first portion between the entrance to the nozzle and the membrane and a second portion between the membrane and the return channel. The first portion and the second portion may be separated by the membrane and the hole through the membrane may fluidically connect the first portion to the second portion. The first portion may be on a side of the membrane farther from the outer surface and the second portion may be on a side of the membrane closer to the outer surface. The first portion may be in the body and the second portion may be in the nozzle layer. The first portion may be on a side of the membrane closer to the outer surface and the second portion may be on a side of the membrane farther from the outer surface.

The second channel and the return channel may be separated by the membrane and the hole through the membrane may fluidically connect the second channel to the return channel. A surface of the membrane farther from the outer surface may be coplanar with a bottom surface of the return channel.

The membrane may be formed across the nozzle.

The membrane may have a plurality of holes therethrough. The plurality of holes may be spaced uniformly across the membrane. The plurality of holes may be configured to provide a filter.

A membrane layer may extend parallel to the outer surface and span the fluid ejector, and the membrane may be provided by a portion of the membrane layer. The membrane layer may be embedded in the body. The membrane layer may be between the body and the nozzle layer. A cavity may be positioned adjacent to and fluidically separated by the membrane layer from the return channel or a supply channel fluidically connected to the pumping chamber. The cavity and a portion of the layer over the cavity may provide a compliant microstructure to reduce cross-talk.

A wafer of a first material may be joined to a side of the membrane layer farther from the outer surface and a device layer of the first material may be joined to a side of the layer closer to the outer surface. The membrane may be a second material different of different material composition from the first material. The first material may be single crystal silicon. The second material may be silicon oxide.

The membrane may extends substantially parallel to the outer surface. The hole may be spaced away from walls of the first passage, the second passage or the nozzle, respectively, on all sides of the hole. The membrane may project inwardly substantially perpendicular to walls of the first passage, the second passage or the nozzle, respectively. The membrane may be formed of a material that has a lower elastic modulus than an elastic modulus of a material forming walls of the first passage, the second passage or the nozzle, respectively. The membrane may be more flexible than walls of the first passage, the second passage or the nozzle, respectively. The hole through the membrane may be narrower than the exit opening of the nozzle.

The membrane may be formed of an oxide, and may have a thickness between about 0.5 μm and about 5 μm. The membrane may be formed of a polymer, and may have a thickness between about 10 μm and about 30 μm.

In another aspect, a fluid ejector includes a substrate and a membrane. The substrate includes a nozzle having an opening in an outer surface of the substrate, a flow path including a first portion from a pumping chamber to the nozzle and a second portion from the nozzle to a return channel, and an actuator configured to cause fluid to flow out of the pumping chamber such that actuation of the actuator causes fluid to be ejected from the nozzle. The membrane is formed across the second portion of the flow path and configured to provide an impedance to the flow path that depends on an oscillation frequency of fluid in the flow path. The membrane has at least one hole therethrough and in operation fluid flows through the at least one hole in the membrane.

Implementations may include one or more of the following features.

The membrane may be configured to provide a first impedance when fluid is being ejected from the nozzle and a second impedance when fluid is not ejected from the nozzle. The first impedance may be greater than the second impedance. The membrane may be configured to provide a maximum impedance to the flow path at or around a resonance frequency of the nozzle.

The first impedance is greater than the second impedance. A membrane is formed across the second portion of the flow. The membrane is configured to provide an impedance to the flow path that depends on an oscillation frequency of fluid in the flow path. The membrane may be more flexible than walls of the flow path. The membrane may extend substantially parallel to the outer surface. The membrane may project inwardly substantially perpendicular to walls of the flow path.

A compliance microstructure may be adjacent the return channel or a supply channel fluidically connected to the pumping chamber, and a membrane layer that provides the membrane may separate a cavity from the return channel or the supply channel, respectively.

In another aspect, a method of fluid ejection includes ejecting fluid from a nozzle of a fluid ejector, and refilling the nozzle with fluid from a flow path. A membrane is formed across the flow path and provides the flow path with a first impedance when fluid is being ejected from the nozzle and a second impedance when fluid is not being ejected from the nozzle. The membrane has at least one hole therethrough.

Implementations may include one or more of the following features.

Refilling the nozzle may include flowing fluid in the flow path through the at least one hole defined by the membrane. The flow path may fluidically connect the nozzle to a return channel. The flow path may fluidically connect the nozzle to a pumping chamber. Ejecting fluid from the nozzle may include actuating an actuator to cause fluid to be ejected from a pumping chamber fluidically connected to the nozzle.

In another aspect, a method of fabricating a fluid ejector includes forming a nozzle in a nozzle layer, the nozzle layer having a first surface in which the nozzle has an exit opening for ejection of fluid, forming a membrane on a second surface of the nozzle layer on a side of the nozzle layer farther from the first surface, forming at least one hole through the membrane, and attaching a side of the membrane farther from the nozzle layer to a wafer having a pumping chamber and a return channel such that the at least one hole in the membrane provides a constriction in a passage between the pumping chamber and the nozzle or a second passage between the nozzle and the return channel.

Implementations may include one or more of the following features.

An actuator may be formed on the wafer. The actuator may be configured to cause fluid to flow out of the pumping chamber such that actuation of the actuator causes fluid to be ejected from the nozzle. The membrane and at least one hole may be formed to have a maximum impedance at or around a resonance frequency of the nozzle. Forming the at least one hole may include etching the membrane. Multiple holes may be formed in the membrane. The membrane may be formed of an oxide or a polymer. The nozzle layer may be disposed on a handle layer, and the membrane may be formed on a side of the nozzle layer opposite the handle layer. The handle layer may be removed. The approaches described here can have one or more of the following advantages.

The impedance feature allow sufficiently high pressures to be achieved during fluid ejection while also allowing rapid refilling of depleted nozzles. The impedance feature can be fabricated using existing fabrication techniques and with few additional steps, and thus can be easily integrated into current process flows.

A filter feature can prevent impurities in from reaching and clogging the nozzle or from being ejected onto the surface. The filter can be fabricated in conjunction with compliance features in a supply or return channel without significantly increasing fabrication complexity.

The details of one or more embodiments are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
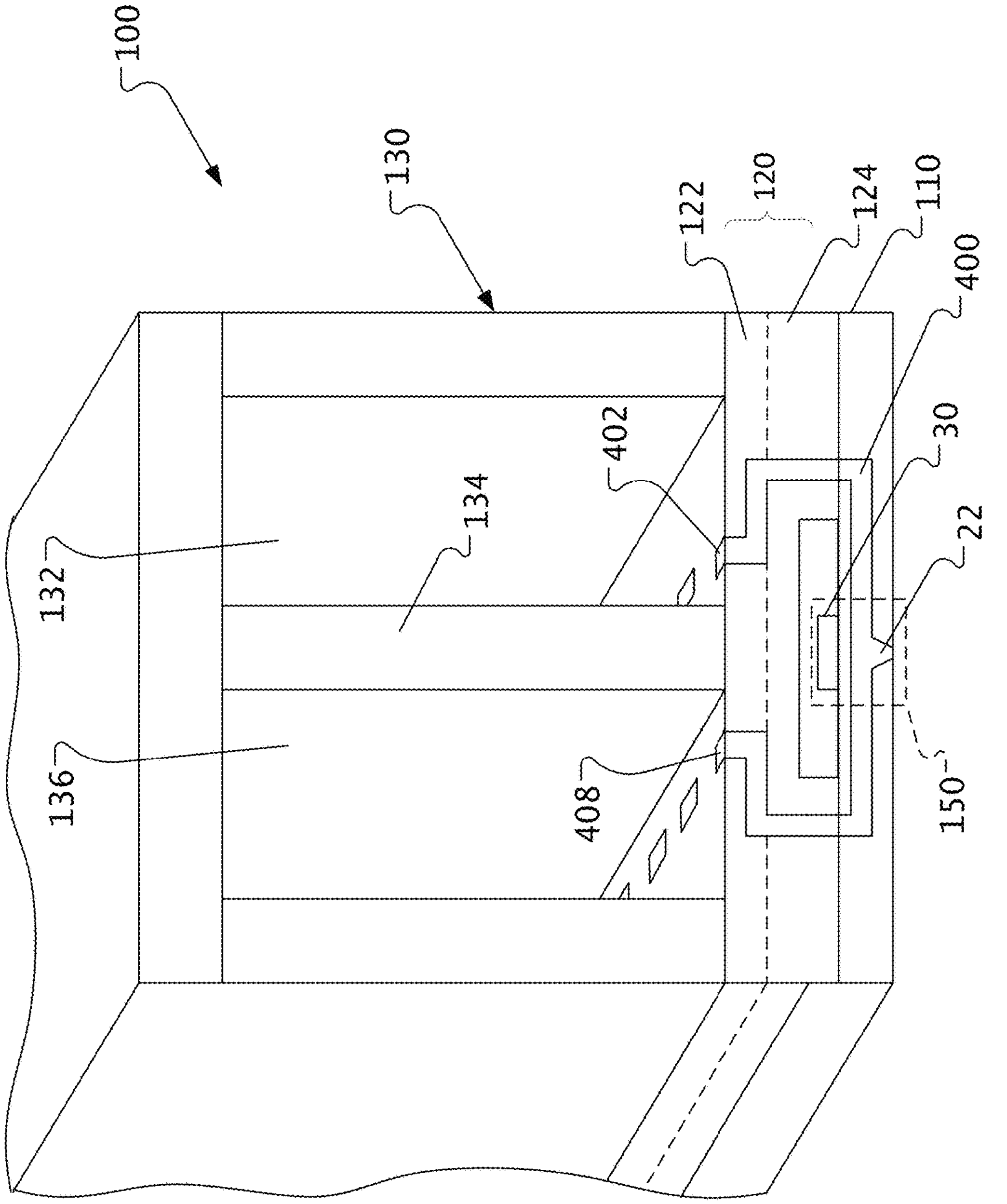
FIG. 1 is a schematic perspective view, cross-sectional and partially cut away, of a printhead.

Referring to FIG. 1, a printhead 100 can be used for ejecting droplets of fluid, such as ink, biological liquids, polymers, liquids for forming electronic components, or other types of liquid, onto a surface. The printhead 100 can include a casing 130 that provides a chamber for holding fluid, a substrate 110 with nozzles and actuators for ejecting fluid from the nozzles, and an interposer 120 to carry fluid from the chamber to the substrate 110. Although one implementation of the casing and interposer for the printhead is described below, other configurations are possible for the printhead, and the casing and interposer are, in fact, optional. For example, flexible tubing could connect inlets and outlets on a top surface of the substrate 110 to a fluid reservoir.

The casing 130 has an interior volume that is divided into a fluid supply chamber 132 and a fluid return chamber 136, e.g., by divider wall 134.

The bottom of the fluid supply chamber 132 and the fluid return chamber 136 can be defined by the top surface of the interposer assembly 120. The interposer assembly 120 can be attached to the casing 130, e.g., onto the bottom surface of the casing 130, such as by bonding, friction, or another mechanism of attachment. The interposer assembly can include an upper interposer 122 and a lower interposer 124 positioned between the upper interposer 122 and a substrate 110. In some implementations, the interposer assembly consists of a single interposer body.

Passages formed in the interposer assembly 120 and the substrate 110 define a flow path 400 for fluid flow. The interposer assembly 120 includes a fluid supply inlet opening 402 and a fluid return outlet opening 408. For instance, the fluid supply inlet opening 402 and fluid return outlet opening 408 can be formed as apertures in the upper interposer 122. Fluid can flow along the flow path 400 from the supply chamber 132, through the fluid supply inlet 402 to one or more fluid ejectors 150 (described in greater detail below) in the substrate 110. An actuator 30 in the fluid ejector 150 can cause a portion of the fluid to be ejected through a nozzle 22. The remaining fluid that is not ejected can flow along the flow path 400 from one or more fluid ejection devices 150 in the substrate 110 through the fluid return outlet opening 408 and into the return chamber 136.

In FIG. 1, a single flow path 400 is shown as a straight passage for illustrative purposes. However, the printhead 100 can include multiple flow paths 400, and the flow paths 400 can be considerably more geometrically complex, e.g., the flow paths are not necessarily straight.

Referring to FIGS. 2 and 3A-3D, the substrate 110 can include a body 10 in which various passages of the fluid path, such as the pumping chamber are formed, a nozzle layer 11 in which the nozzles 22 are formed, and the actuators 30 for the fluid ejectors 150. The substrate 110 can be formed by semiconductor chip fabrication processes.

Passages through the substrate 110 define a flow path 400 for fluid through the substrate 110. In particular, a substrate inlet 12 receives fluid, e.g., from the supply chamber 132 via the fluid supply inlet 402 in the interposer assembly. The substrate inlet 12 extends through a membrane layer 66 (discussed in more detail below), and supplies fluid to one or more inlet feed channels 14. The inlet feed channels 14 are also called supply channels. Each inlet feed channel 14 supplies fluid to multiple fluid ejectors 150 through a corresponding inlet passage (not shown). Fluid can be selectively ejected from the nozzle 22 of each fluid ejector 150 to print onto a surface. For simplicity, only one fluid ejector 150 is shown in FIGS. 2 and 3A-3D. The possible location of descenders of other fluid ejectors are shown in phantom in FIG. 2.

The body 10 can be a monolithic body, e.g., a monolithic semiconductor body, such as a silicon substrate. For example, the body 10 can be single-crystal silicon.

Each fluid ejector includes a nozzle 22 formed in a nozzle layer 11 that is disposed on a bottom surface of the substrate 110. In some implementations, the nozzle layer 11 is an integral part of the substrate 110, e.g., the nozzle layer 11 is formed of the same material and crystalline structure, e.g., single crystal silicon, as the body 10. In some implementations, the nozzle layer 11 is a layer of different material, e.g., silicon oxide, that is deposited onto the surface of the body 10 to form the substrate 110. In some implementations, the nozzle layer 11 comprises multiple layers, e.g., a silicon layer and one or more oxide layers.

Fluid flows through each fluid ejector 150 along an ejector flow path 475. The ejector flow path 475 can include a pumping chamber inlet passage 16, a pumping chamber 18, a descender 20, and an outlet passage 26. The pumping chamber inlet passage 16 fluidically connects the pumping chamber 18 to the inlet feed channel 14 and can include, e.g., an ascender that extends vertically from the inlet feed channel 14 a pumping chamber inlet that extends horizontally from the ascender to the pumping chamber. The descender 20 is fluidically connected to a corresponding nozzle 22, e.g., at the bottom of the descender. The outlet passage 26 connects the descender 20 to an outlet feed channel 28, which is in fluidic connection with the return chamber through a substrate outlet and the fluid supply outlet 408 (see FIG. 1). The outlet feed channel 28 is also called a return channel. \

The descender 20 is fluidically connected to a corresponding nozzle 22, e.g., at the bottom of the descender 20. In general, the nozzle 22 can be considered the portion of the flow path after the intersection of the outlet passage 26 to the descender.

In the example of FIGS. 2 and 3A-3D, passages such as the substrate inlet 12, the inlet feed channel 14, and the outlet feed channel 28 are shown in a common plane. However, in some implementations (e.g., in the examples of FIGS. 4A and 4B), one or more of the substrate inlet 12, the inlet feed channel 14, and the outlet feed channel 28 are not in a common plane with the other passages.

Figure 4A:
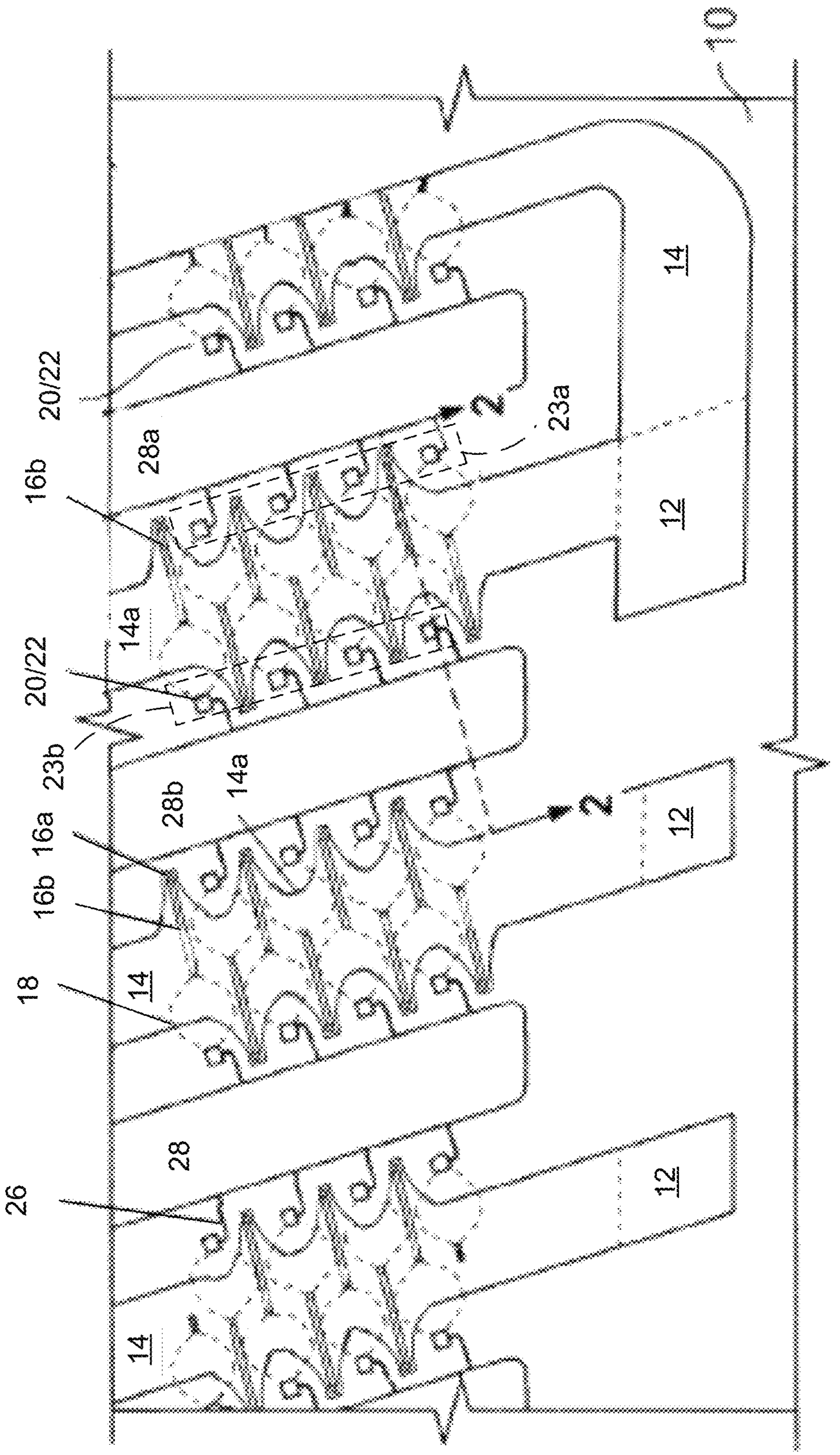
FIG. 4A is a schematic cross-sectional view of a portion of the printhead taken along line B-B in FIG. 2.
Figure 4B:
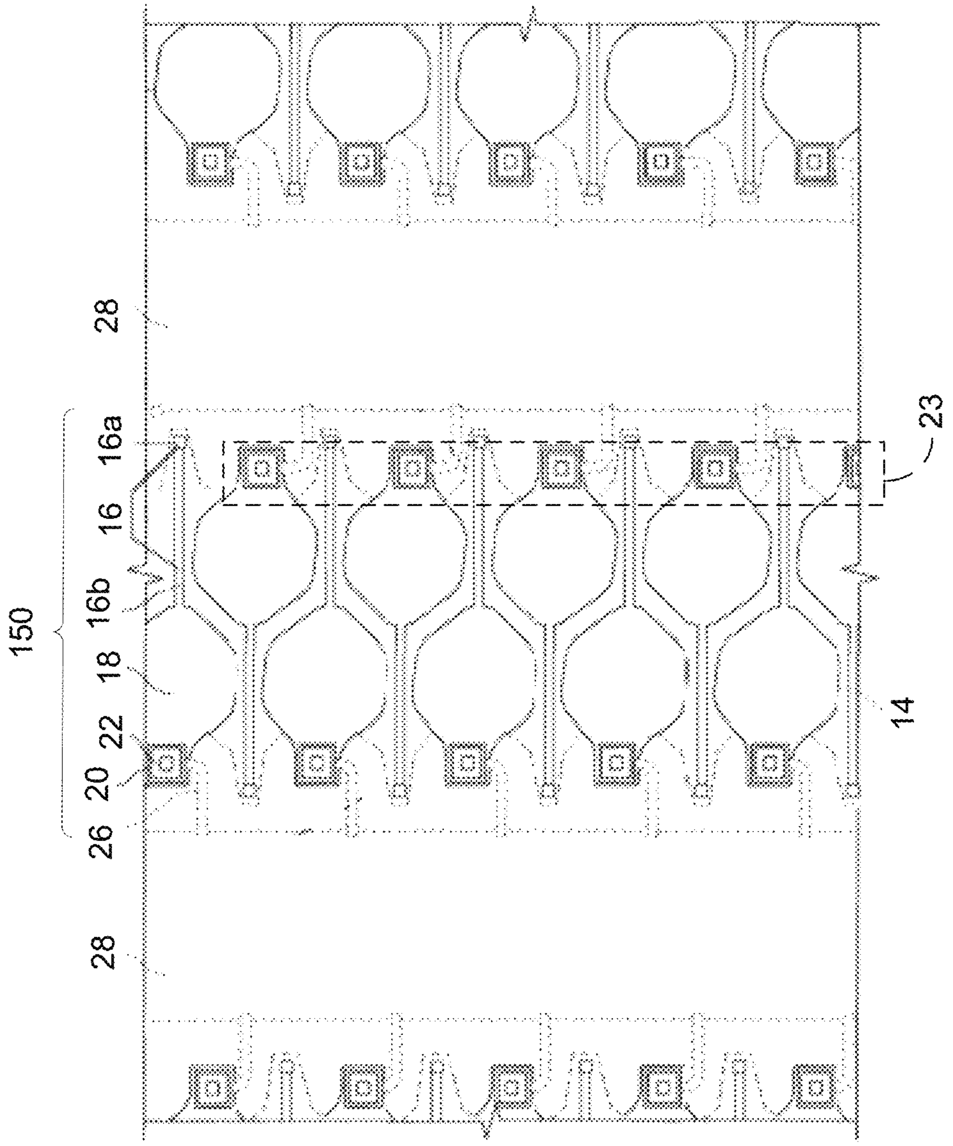
FIG. 4B is a schematic cross sectional view of a portion of the printhead taken along line C-C in FIG. 2.

Referring to FIGS. 4A and 4B, the substrate 110 includes multiple inlet feed channels 14 formed therein and extending parallel with one another and to the plane of the bottom surface 112 (see FIG. 2) of the substrate 110. Each inlet feed channel 14 is in fluidic communication with at least one substrate inlet 12 that extends perpendicular to the inlet feed channels 14, e.g., perpendicular to the plane of the bottom surface 112 of the substrate 110. The substrate 110 also includes multiple outlet feed channels 28 formed therein and extending parallel with one another and to the plane of the bottom surface 112 of the substrate 110. Each outlet feed channel 28 is in fluidic communication with at least one substrate outlet (not shown) that extends perpendicular to the outlet feed channels 28, e.g., perpendicular to the plane of the bottom surface 112 of the substrate 110. In some examples, the inlet feed channels 14 and the outlet feed channels 28 are arranged in alternating rows.

The outlet feed channel 28 has a larger cross-sectional area than an outlet passages 26, e.g., to handle the combined multiple outlet feed channels 28. For example, as shown in FIGS. 3A-3D, the outlet feed channel 28 can have a height (measured perpendicular to the surface 11*a*) that is larger than the height of the outlet passages 26. Similarly, as shown in FIG. 4B, the outlet feed channel 28 can have a width (measured parallel to the surface 11*a*) that is larger than the width of the outlet passages 26

Returning to FIGS. 4A and 4B, the substrate includes multiple fluid ejectors 150. Fluid flows through each fluid ejector 150 along a corresponding ejector flow path 475, which includes the pumping chamber inlet passage 16 (including an ascender 16*a* and a horizontal pumping chamber inlet 16*b*), a pumping chamber 18, and a descender 20. Each ascender 16*a* is fluidically connected to one of the inlet feed channels 14. Each ascender 16*a* is also fluidically connected to the corresponding pumping chamber 18 through the pumping chamber inlet 16*b*. The pumping chamber 18 is fluidically connected to the corresponding descender 20, which leads to the associated nozzle 22. Each descender 20 is also connected to one of the outlet feed channels 28 through the corresponding outlet passage 26. For instance, the cross-sectional view of fluid ejectors of FIG. 3A-3D can be taken along line 2-2 of FIG. 4A.

In some examples, the printhead 100 includes multiple nozzles 22 arranged in parallel columns 23 (see FIG. 4B). The nozzles 22 in a given column 23 can be all fluidically connected to the same inlet feed channel 14 and the same outlet feed channel 28. That is, for instance, all of the ascenders 16 in a given column can be connected to the same inlet feed channel 14 and all of the descenders 20 in a given column can be connected to the same outlet feed channel 28.

In some implementations, nozzles 22 in adjacent columns can all be fluidically connected to the same inlet feed channel 14 or the same outlet feed channel 28, but not both. For instance, in the example of FIG. 4A, each nozzle 22 in column 23*a* is fluidically connected to the inlet feed channel 14*a* and to the outlet feed channel 28*a*. Each nozzle 22 in the adjacent column 23*b* is also connected to the inlet feed channel 14*a* but is connected to the outlet feed channel 28*b*.

In some implementations, columns of nozzles 22 can be connected to the same inlet feed channel 14 or the same outlet feed channel 28 in an alternating pattern. In some implementations, columns of nozzles 22 can be connected to the same inlet feed channel 14 or the same outlet feed channel 28 in an alternating pattern. In some implementations, the walls 14*a* of the inlet feed channels 14 have indentations, e.g., form a scalloped, wavy or zig-zag pattern, to disrupt cross-talk. Further details about the printhead 100 can be found in U.S. Pat. No. 7,566,118, the contents of which are incorporated herein by reference in their entirety.

Referring again to FIG. 2, each fluid ejector 150 includes a corresponding actuator 30, such as a piezoelectric transducer or a resistive heater. The pumping chamber 18 of each fluid ejector 150 is in close proximity to the corresponding actuator 30. Each actuator 30 can be selectively actuated to pressurize the corresponding pumping chamber 18, thus ejecting fluid from the nozzle 22 that is connected to the pressurized pumping chamber.

Figure 2:
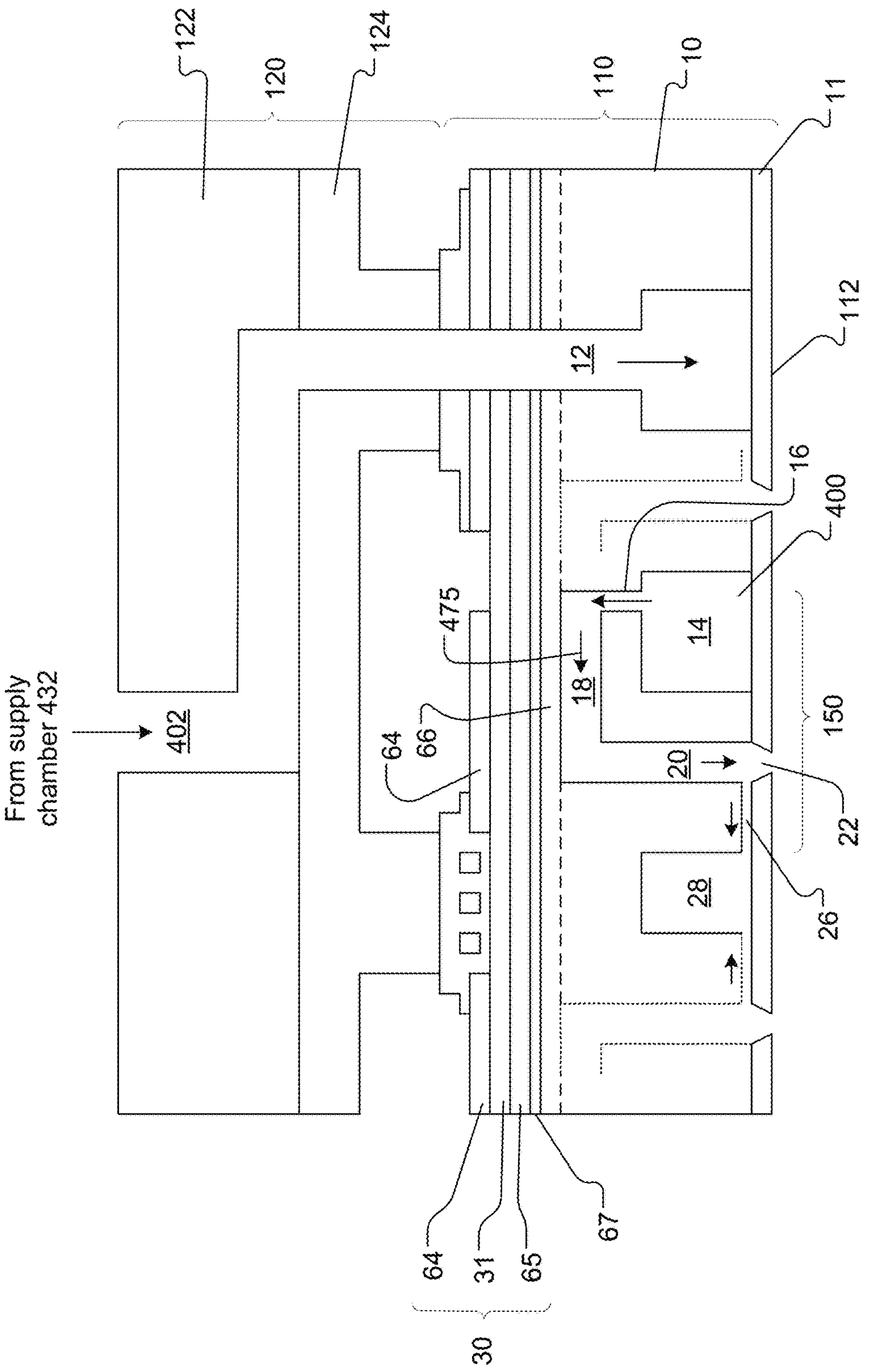
FIG. 2 is a schematic cross-sectional view of a portion of a printhead.

In some examples, the actuator 30 can include a piezoelectric layer 31, such as a layer of lead zirconium titanate (PZT). The piezoelectric layer 31 can have a thickness of about 50 μm or less, e.g., about 1 μm to about 25 μm, e.g., about 2 μm to about 5 μm. In the example of FIG. 2, the piezoelectric layer 31 is continuous. In some examples, the piezoelectric layer 31 can be made discontinuous, e.g., by an etching or sawing step during fabrication. The discontinuous piezoelectric layer 31 can overlie at least the pumping chamber 18, but not the entire body 10.

The piezoelectric layer 31 is sandwiched between a drive electrode 64 and a ground electrode 65. The drive electrode 64 and the ground electrode 65 can be metal, such as copper, gold, tungsten, titanium, platinum, or a combination of metals, or another conductive material, such as indium-tin-oxide (ITO). The thickness of the drive electrode 64 and the ground electrode 65 can be, e.g., about 2 μm or less, e.g., about 0.5 μm.

A membrane 66 is disposed between the actuator 30 and the pumping chamber 18 and isolates the actuator 30, e.g., the ground electrode 65, from fluid in the pumping chamber 18. In some implementations, the membrane 66 is a separate layer, e.g., a layer of silicon oxide, from the body 10. In some implementations, the membrane is unitary with the body 10, e.g., the nozzle layer 11 is formed of the same material and crystalline structure, e.g., single crystal silicon, as the body 10. In some implementations, two or more of the substrate 110, the nozzle layer 11, and the membrane 66 can be formed as a unitary body. In some implementations, the actuator 30 does not include a membrane 66, and the ground electrode 65 is formed on the back side of the piezoelectric layer 31 such that the ground electrode 65 is directly exposed to fluid in the pumping chamber 18.

To actuate the piezoelectric actuator 30, an electrical voltage can be applied between the drive electrode 64 and the ground electrode 65 to apply a voltage to the piezoelectric layer 31. The applied voltage causes the piezoelectric layer 31 to deflect, which in turn causes the membrane 66 to deflect. The deflection of the membrane 66 causes a change in volume of the pumping chamber 18, producing a pressure pulse (also referred to as a firing pulse) in the pumping chamber 18. The pressure pulse propagates through the descender 20 to the corresponding nozzle 22, thus causing a droplet of fluid to be ejected from the nozzle 22.

The membrane 66 can be a single layer of silicon (e.g., single crystalline silicon), another semiconductor material, one or more layers of oxide, such as aluminum oxide (AlO2), zirconium oxide (ZrO2), or silicon oxide ($SiO_2$), aluminum nitride, silicon carbide, ceramics or metal, or another material. For instance, the membrane 66 can be formed of an inert material that has a compliance such that the actuation of the actuator 30 causes flexure of the membrane 66 sufficient to cause a droplet of fluid to be ejected.

In some implementations, the membrane 66 can be secured to the actuator 30 with an adhesive layer 67. In some implementations, the layers of the actuator 30 are deposited directly on the membrane 66.

When fluid is ejected from the nozzle 22 of a fluid ejector 150, the nozzle 22 can become at least partially depleted of fluid. Circulation of fluid through the inlet and outlet feed channels 14, 28 (sometimes referred to generally as feed channels) can provide fluid to refill the depleted nozzle 22. Without being limited to any particular theory, although fluid can flow through the outlet passage 26 toward the toward the outlet feed channel 28 during ejection of a droplet of fluid, after ejection when the nozzle 22 is depleted, it is also possible for fluid to flow back through the outlet passage 26 toward the nozzle 22 to refill the nozzle 22.

If the depleted nozzle 22 can be refilled quickly after ejection, the nozzle can be readied more quickly for a subsequent ejection, thus improving the response time of the fluid ejector 150. For instance, the speed with which the nozzle 22 can be refilled can be increased by increasing the cross-sectional area of one or more of the fluid flow passages that supply fluid to the nozzle 22, such as the descender 20, the outlet passage 26, or another fluid flow passage. However, with large fluid flow passages supplying fluid to the nozzle 22, it can sometimes be difficult to achieve a high enough pressure at the nozzle opening 24 for efficient fluid ejection (sometimes referred to as jetting). Conversely, smaller fluid flow passages supplying fluid to the nozzle 22 can make it easier to achieve pressures sufficient for efficient jetting, but can also limit the speed with which the nozzle 22 can be refilled.

Figure 3A:
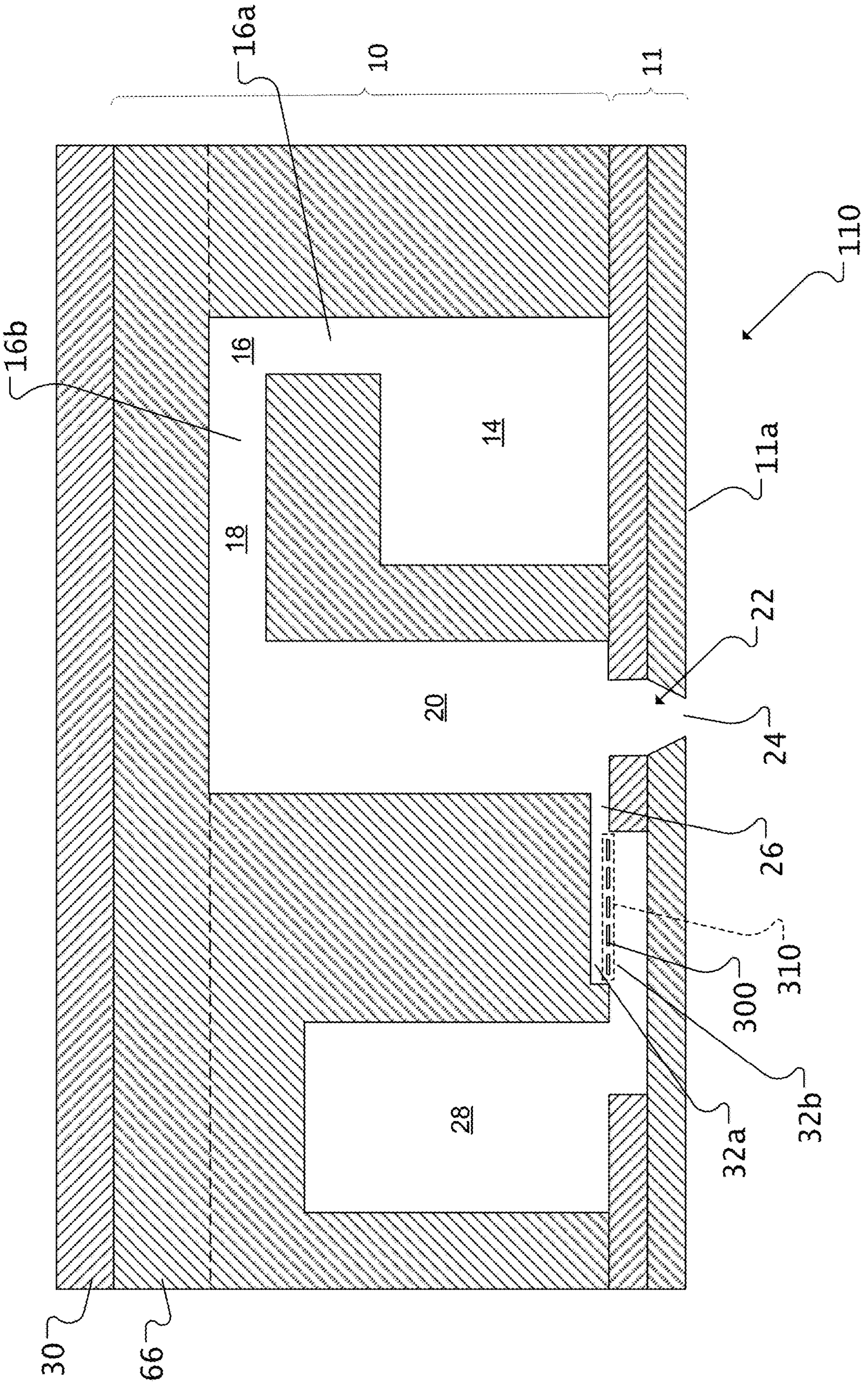
FIGS. 3A-3D are schematic a cross-sectional views of three implementations of a fluid ejector.
Figure 5B:
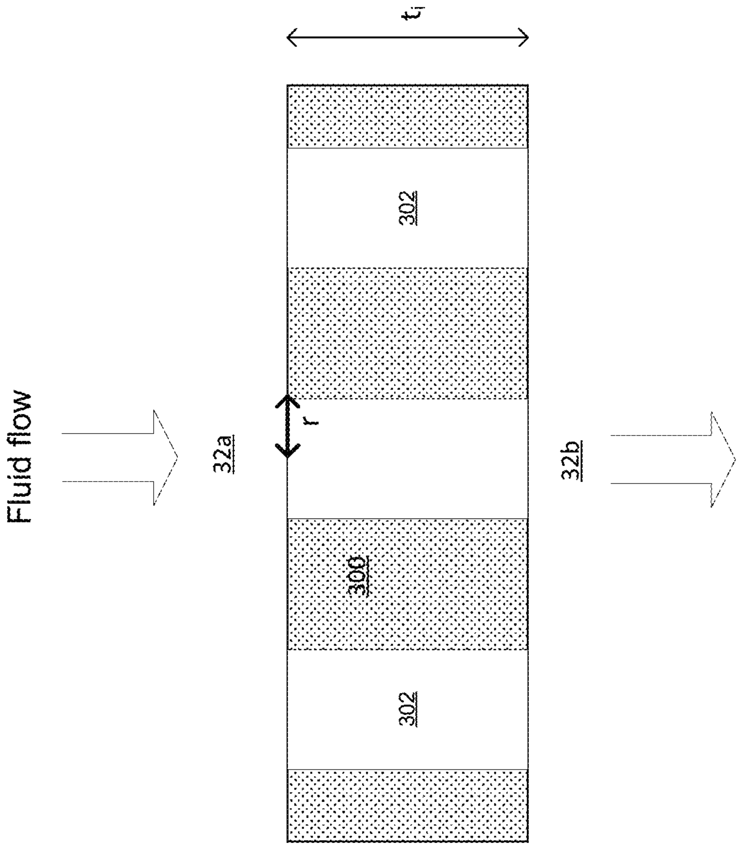
FIGS. 5A-5B are a schematic top and side views, respectively, of a membrane.
Figure 5A:
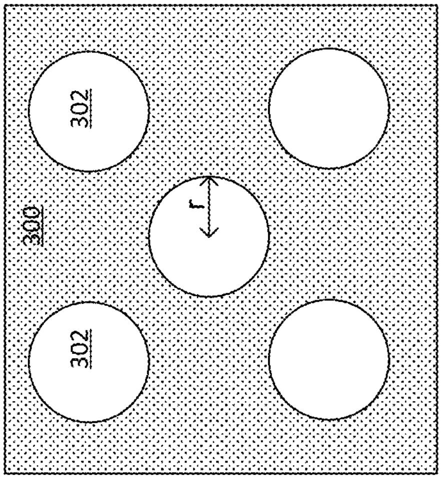

Referring to FIGS. 3A and 5A-5B, in some cases, in order to achieve both rapid nozzle refilling and sufficiently high nozzle pressures during jetting, an impedance structure 310, such as a membrane 300, can be positioned in the fluid flow path close to the nozzle. The membrane 300 can have one or more holes 302 through the thickness of the membrane. The membrane 300 is positioned in the flow path such that fluid flows through the holes 302 in the membrane 300.

Figure 3B:
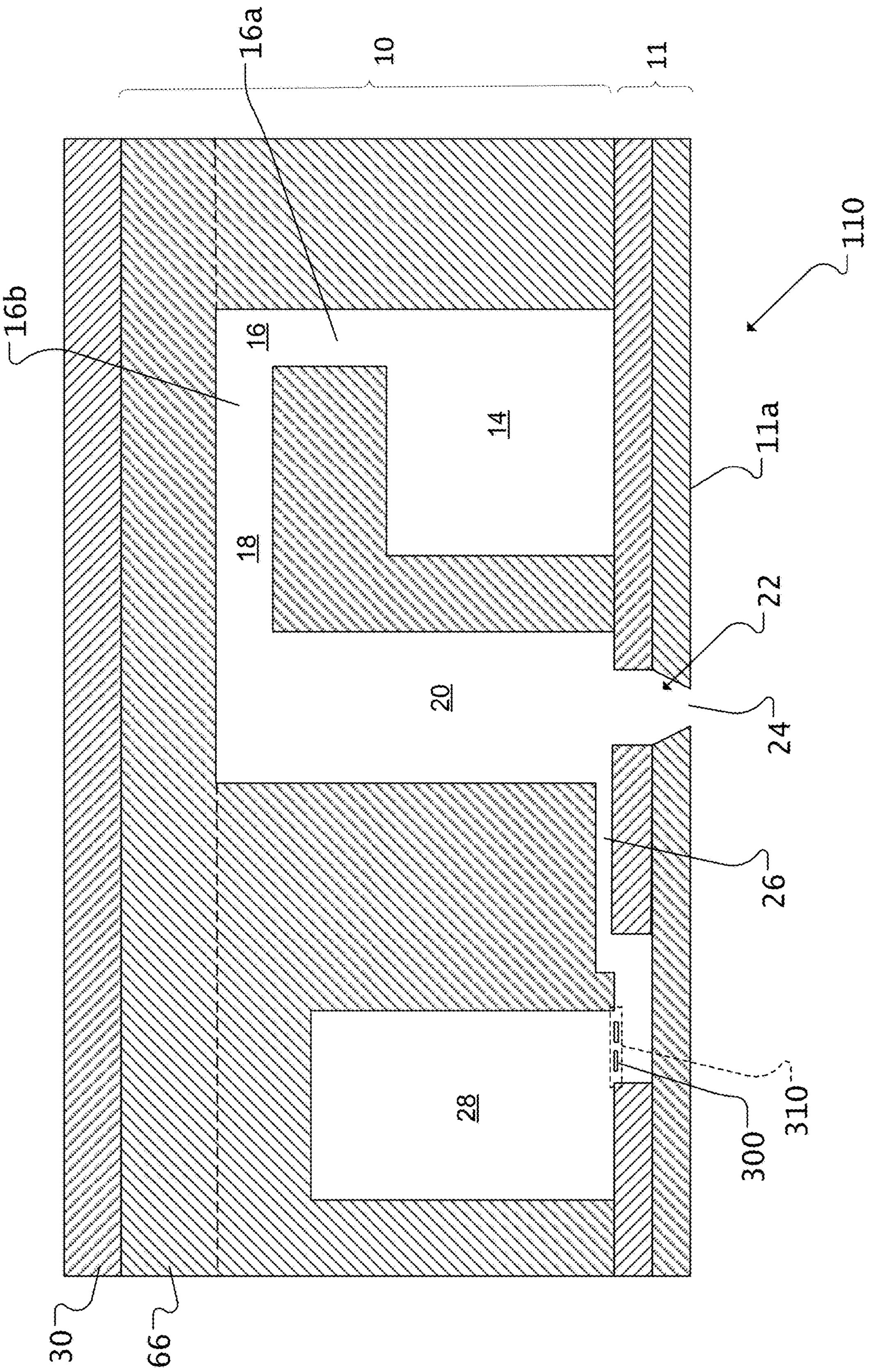

In the example of FIG. 3A, the membrane 300 is positioned in the outlet passage 26 and provides the impedance structure 310. In this example, the outlet passage 26 includes a portion 32*a* above the membrane 300, and a portion 32*b* below the membrane 26. In the example of FIG. 3B, the impedance structure 310 includes a membrane 300 positioned between the outlet passage 26 and the return channel 28. In this case, the membrane can form a bottom surface of the return channel 28, e.g., the top surface of the membrane 300 can coplanar with the bottom surface of the return channel 28.

However, the membrane 300 can alternatively be positioned at other locations in the inlet flow path, the outlet flow path, or both, and can provide other functions.

Figure 3C:
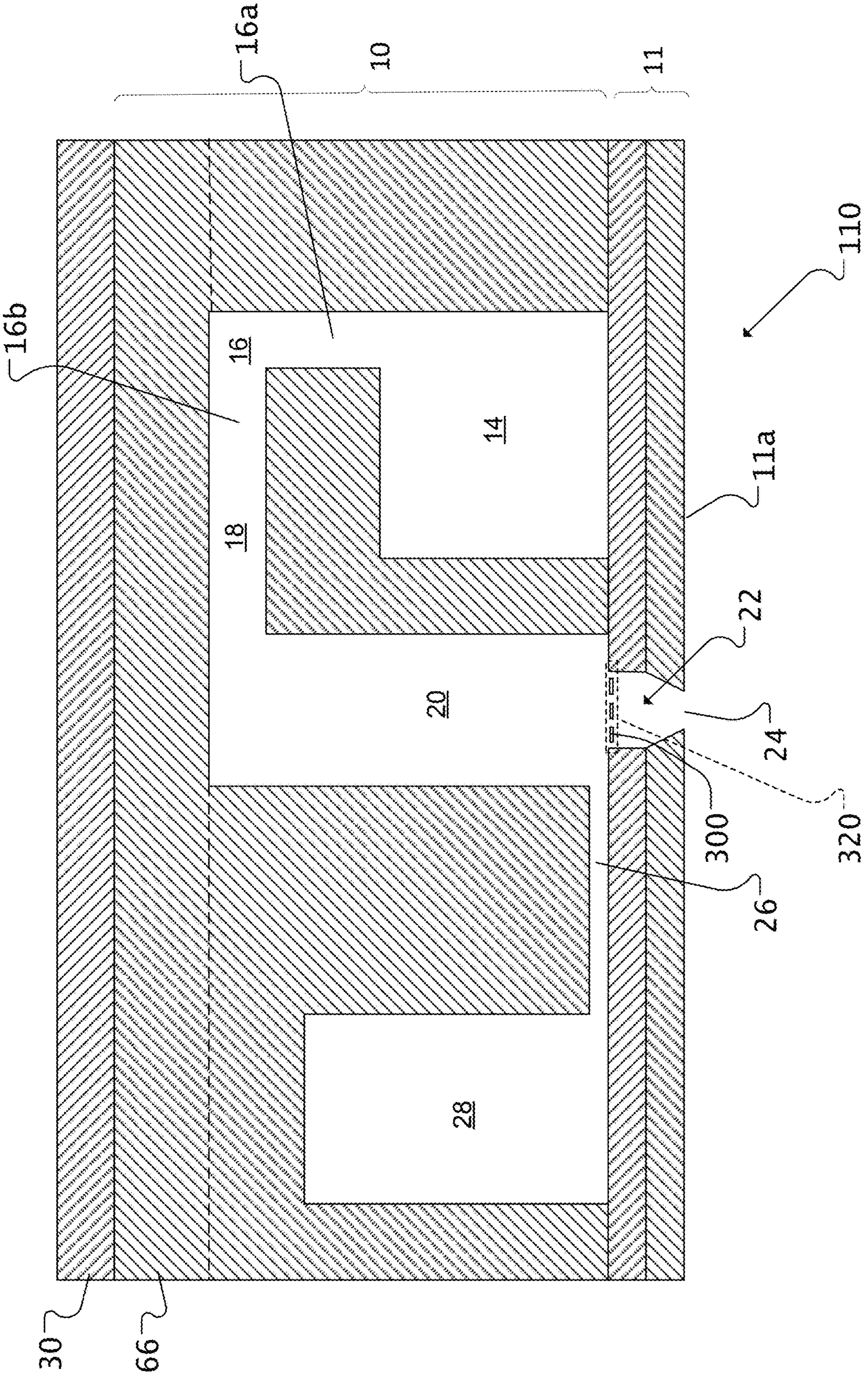

Referring to FIGS. 3C and 5A-5B, in some cases a filter feature 320 can be positioned in the fluid flow path close to the nozzle to prevent contaminants from reaching the nozzle or from being ejected from the nozzle. The filter feature 320 can be provided by a membrane 300 having one or more holes 302 through the thickness of the membrane.

Figure 3D:
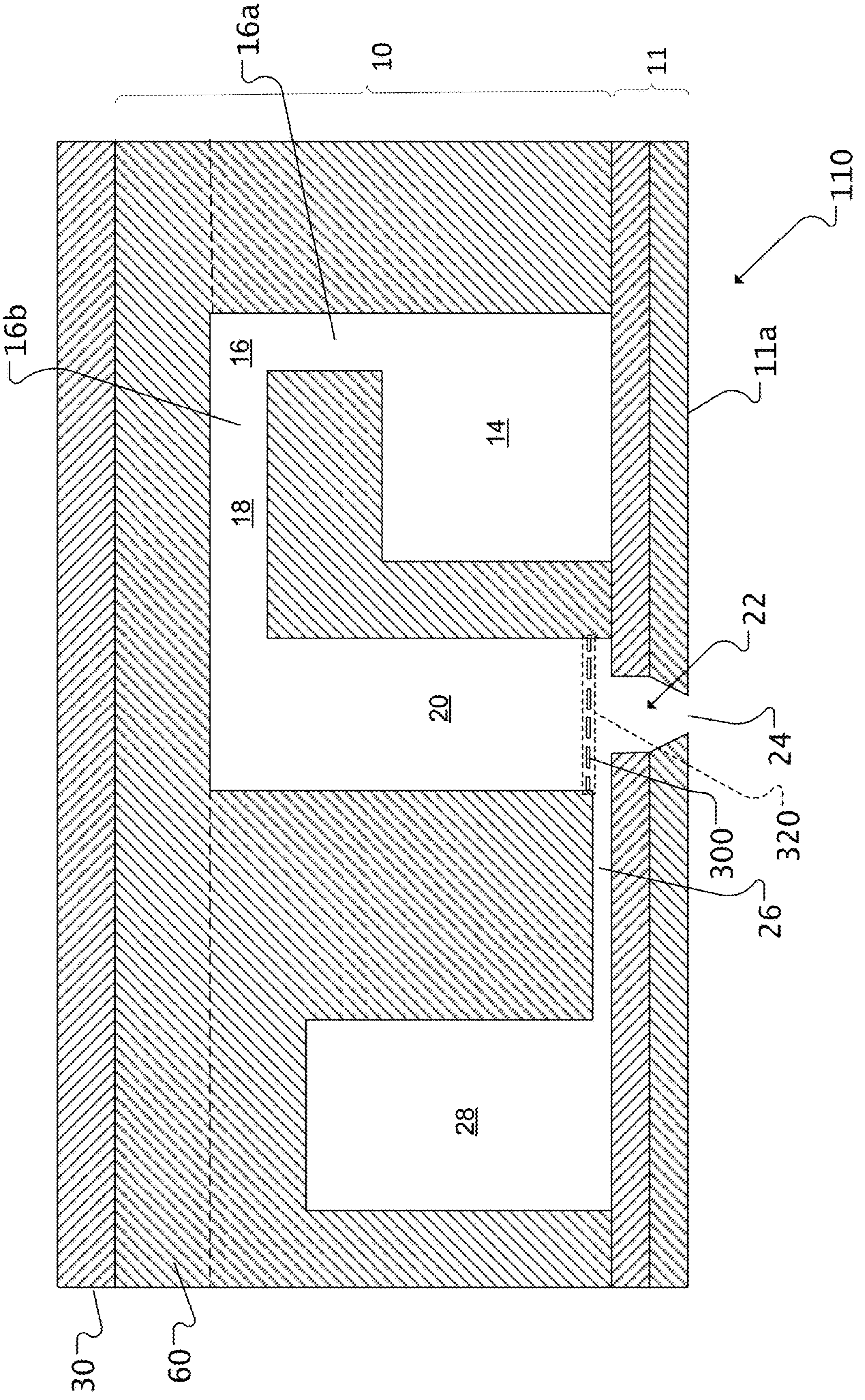

As shown in FIG. 3C, the membrane 300 can be positioned across the nozzle 22 after (i.e., closer to the nozzle opening 24 than) the intersection between the descender 20 and the outlet passage 26. For example, the membrane 300 can be positioned immediately after the intersection, e.g., the top surface of the membrane can be co-planar with the bottom surface of the outlet passage 26. As shown in FIG. 3D, the membrane 300 can be positioned across the descender 20 before (i.e., farther from the nozzle opening 24 than) the intersection between the descender 20 and the outlet passage 26. For example, the membrane can be positioned immediately before the intersection, e.g., the bottom surface of the membrane can be co-planar with the top surface of the outlet passage 26.

In each of the above examples of FIGS. 3A-3D, the membrane 300 lies in a plane parallel to the outer surface 11*a* of the nozzle layer 11. Thus the holes can extend perpendicular to the outer surface 11*a* of the nozzle layer 11.

Turning to FIGS. 3A-3B and 5A-5B, as the impedance structure 310, the membrane 300 can be configured to introduce a fluidic impedance to the flow passage in which the impedance membrane is positioned, such as the fluid flow path between the descender and the return channel. The value of the fluidic impedance introduced by the impedance membrane 300 can be dependent on frequency. For instance, oscillations can occur in the fluid in the flow passage. The impedance membrane can introduce a fluidic impedance at or around a particular frequency of the fluid oscillations that is higher than the fluidic impedance at other frequencies of the fluid oscillations. For instance, the impedance membrane 300 can provide a high impedance at or around the jet resonance frequency, which is the frequency at which the nozzle 22 has high fluid flow during jetting. In some implementations of the fluid ejector 150, the jet resonance frequency is between about 40 Khz and 10 Mhz. In some implementations, the impedance is about 20 dB or a factor of 10

At or around the jet resonance frequency (e.g., when the nozzle 22 is ejecting fluid), the impedance membrane 300 thus introduces a sufficiently high fluidic impedance into the fluid flow passage in the vicinity of the nozzle 22 to direct fluid flow and pressure to the nozzle to provide efficient jetting. At other frequencies (e.g., frequencies not at or around the jet resonance frequency, such as when the nozzle 22 is not ejecting fluid), the impedance membrane introduces a lower fluidic impedance, thus enabling rapid refilling of the depleted nozzle.

In order to achieve a higher fluidic impedance at certain frequencies (e.g., at or around the jet resonance frequency) and a lower fluidic impedance at other frequencies, the impedance membrane 300 can act as a capacitor that is in parallel with an inductor along the fluid flow path. For instance, the membrane 300 itself can be a compliant membrane that acts as a capacitive element in the fluid flow path, and the holes 302 act as the inductor element. In this case, when a volume on one side of the membrane is pressurized, the membrane will move and hence there will be some viscous resistance. However, without being limited to any particular theory, impedance effects from the holes can dominate.

In some cases, the compliance of the membrane 300 can also provide a resistance that can help to dampen oscillations in the fluid flow passage, e.g., as discussed below.

As the filter feature 320, the membrane 300 can also act as a filter to prevent foreign bodies, such as impurities in the fluid, from reaching and clogging the nozzle 22. For example, the membrane 300 shown in FIGS. 3C and 3D can act primarily as a filter rather than to adjust the fluidic impedance to affect the rate of refilling of the depleted nozzle.

The membrane 300 can be formed of a material that is compatible with fabrication processes (e.g., microelectromechanical systems (MEMS) fabrication processes) used to fabricate other components of the fluid ejectors 150. For instance, in some cases, the membrane 300 can be formed of an oxide (e.g., $SiO_2$), a nitride (e.g., $Si_3N_4$), or another insulating material. In some cases, the membrane 300 can be formed of silicon. In some cases, the membrane 300 can be formed of metal, e.g., a sputtered metal layer. In some cases, the membrane 300 can be formed of a relatively soft and compliant material, such as polyimide or a polymer (e.g., poly(methyl methacrylate) (PMMA), polydimethylsiloxane (PDMS), or another polymer). In some cases, the membrane 300 can be formed of a material that is more flexible or softer than the material forming the walls of the fluid flow path, e.g., a material that has a lower elastic modulus than the material forming the walls of the fluid flow path. In some cases, the thickness of the membrane 300 can cause the membrane 300 to be more flexible than the walls of the fluid flow path.

In general, when acting as an impedance feature, the membrane 300 can be thin enough to be able to deflect slightly in order to act as a capacitive element in the fluid flow path. The membrane 300 is also thick enough to be durable against expected pressure fluctuations or fluid flow oscillations. The appropriate thickness $t_i$ of the impedance membrane 300 to provide this functionality depends on properties of the membrane material, such as the elastic modulus of the membrane material.

As either a filter feature or impedance feature, a membrane 300 formed of $SiO_2$ can have a thickness of between about 0.5 μm and about 5 μm, e.g., about 1 μm, about 2 μm, or about 3 μm. A membrane 300 formed of a compliant polymer can have a thickness of between about 10 μm and about 30 μm, e.g., about 20 μm, about 25 μm, or about 30 μm, e.g., depending on the modulus of the polymer. The size of the membrane 300 is determined by the size of the flow passage in which the membrane is placed; for instance, the lateral dimensions of the membrane match the cross-sectional width and depth of the flow passage.

Characteristics of the holes 302 in the membrane 300, such as the number, size, shape, and/or arrangement of the holes 302, can be selected such that the impedance of the membrane 300 is highest at the desired frequency (e.g., at or around the jet resonance frequency). For instance, there can be between one and ten holes 302 in the impedance membrane 300, e.g., 2 holes, 4 holes, 6 holes, 8 holes, or another number of holes. The holes 302 can have a lateral dimension (e.g., a radius r) of between about 1 μm and about 10 μm, e.g., about 2 μm, 4 μm, 6 μm, or 8 μm. The holes 302 can be circles, ovals, ellipses, or other shapes. For instance, the holes 302 can be shaped such that there are no sharp corners where mechanical stresses can be concentrated. The holes 302 can be arranged in ordered patterned, such as a rectangular or hexagonal array, or can be randomly distributed.

In some cases, when the actuator 30 of one of the fluid ejectors 150 is actuated, a pressure fluctuation can propagate through the ascender 16 of the fluid ejector 150 and into the inlet feed channel 14. Likewise, energy from the pressure fluctuation can also propagate through the descender 20 of the fluid ejector 150 and the outlet passage 26 and into the outlet feed channel 28. In some cases, this application refers to the inlet feed channel 14 and the outlet feed channel 28 generally as a feed channel 14, 28. Pressure fluctuations can thus develop in one or more of the feed channels 14, 28, that are connected to an actuated fluid ejector 150. In some cases, these pressure fluctuations can propagate into the ejector flow paths 475 of other fluid ejectors 150 that are connected to the same feed channel 14, 28. These pressure fluctuations can adversely affect the drop volume and/or the drop velocity of drops ejected from those fluid ejectors 150, degrading print quality. For instance, variations in drop volume can cause the amount of fluid that is ejected to vary, and variations in drop velocity can cause the location where the ejected drop is deposited onto the printing surface to vary. The inducement of pressure fluctuations in fluid ejectors is referred to as fluidic crosstalk.

Fluidic crosstalk can be reduced by providing greater compliance in the fluid ejectors to attenuate the pressure fluctuations. By increasing the compliance available in the fluid ejectors, the energy from a pressure fluctuation generated in one of the fluid ejectors can be attenuated, thus reducing the effect of the pressure fluctuation on the neighboring fluid ejectors.

Figure 6:
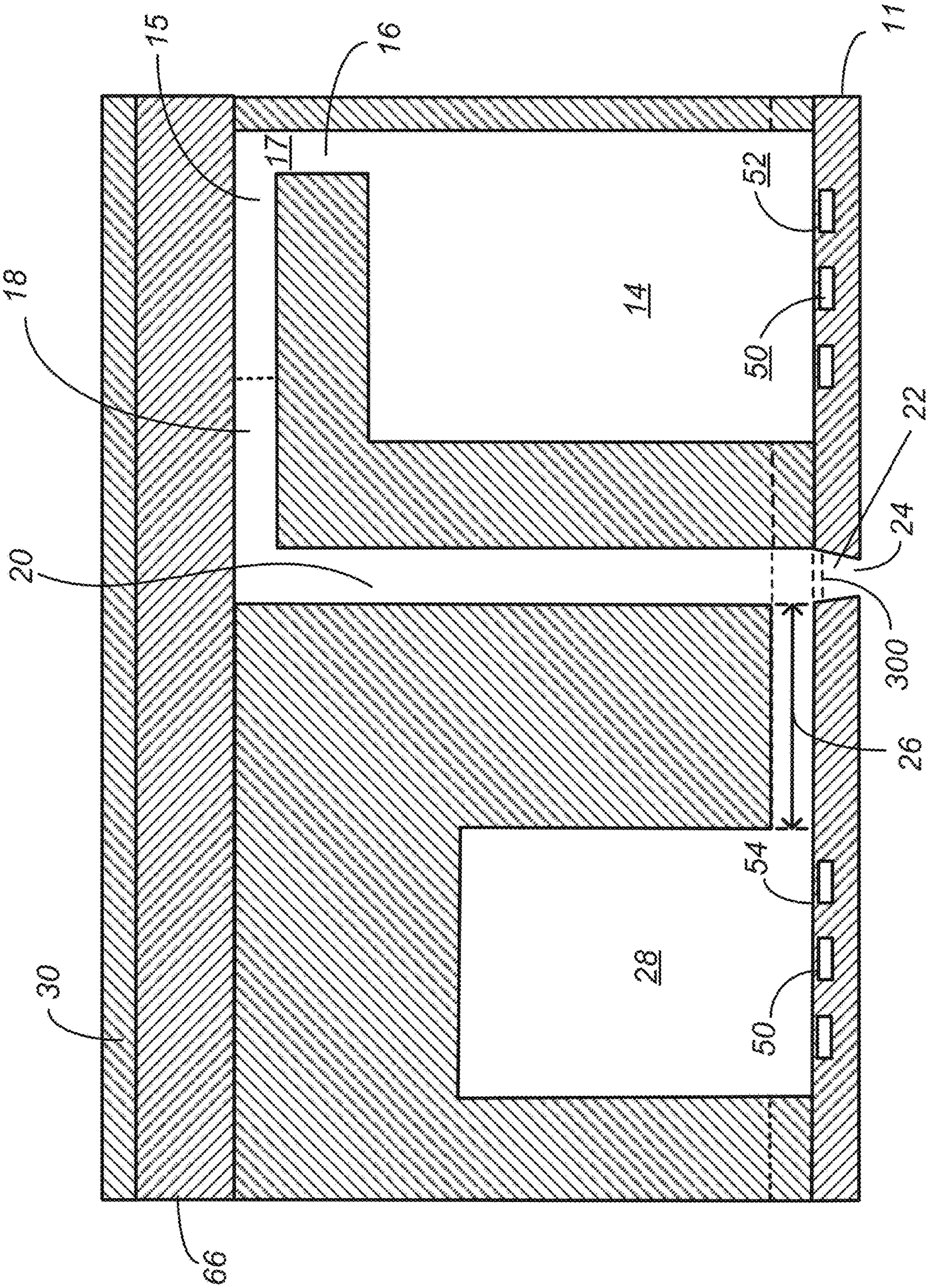
FIG. 6 is a schematic cross-sectional view of a fluid ejector.

Referring to FIG. 6, compliance can be added to the inlet feed channel 14, the outlet feed channel 28, or both, by forming compliant microstructures 50 on one or more surfaces of the inlet feed channel 14 and/or the outlet feed channel 28. The compliant microstructures 50 can be, for example, membranes that span a recess and are thus able to deflect in response to pressure variations.

For instance, in the example of FIG. 6, compliant microstructures 50 are formed in a bottom surface 52 of the inlet feed channel 14 and a bottom surface 54 of the outlet feed channel. In this example, the bottom surfaces 52, 54 are provided by the top surface of the nozzle layer 11. In some examples, the compliant microstructures 50 can be formed in a top surface of a feed channel 14, 28 or a side wall of a feed channel 14, 28. The additional compliance provided by the compliant microstructures 50 in a feed channel 14, 28 attenuates the energy from a pressure fluctuation in a particular fluid ejector 150 that is connected to that feed channel 14, 28. As a result, the effect of that pressure fluctuation on other fluid ejectors 150 connected to that same feed channel 14, 28 can be reduced.

Figure 7A:
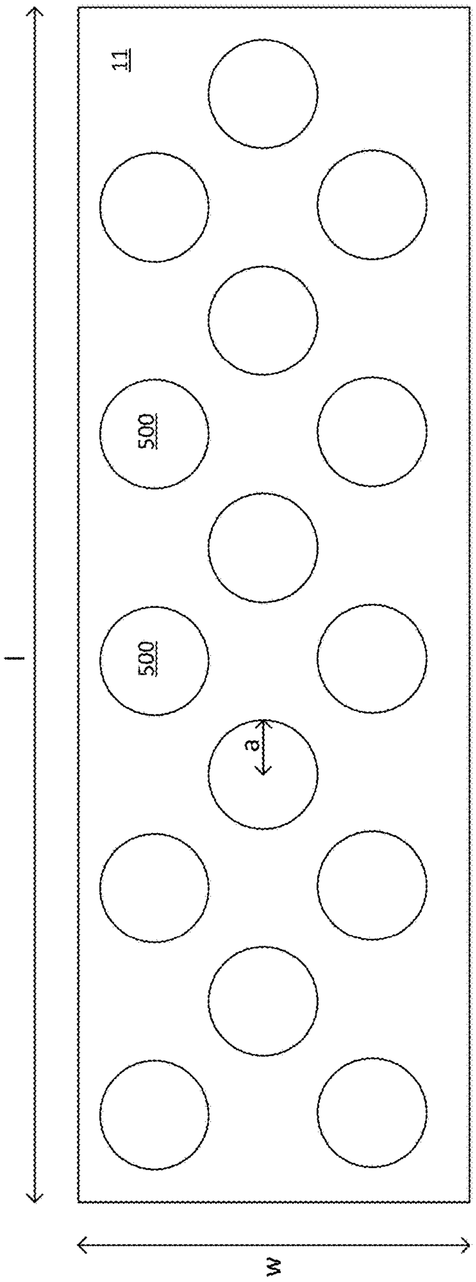
FIGS. 7A and 7B are schematic top and side views, respectively, of a feed channel with recesses.
Figure 7B:
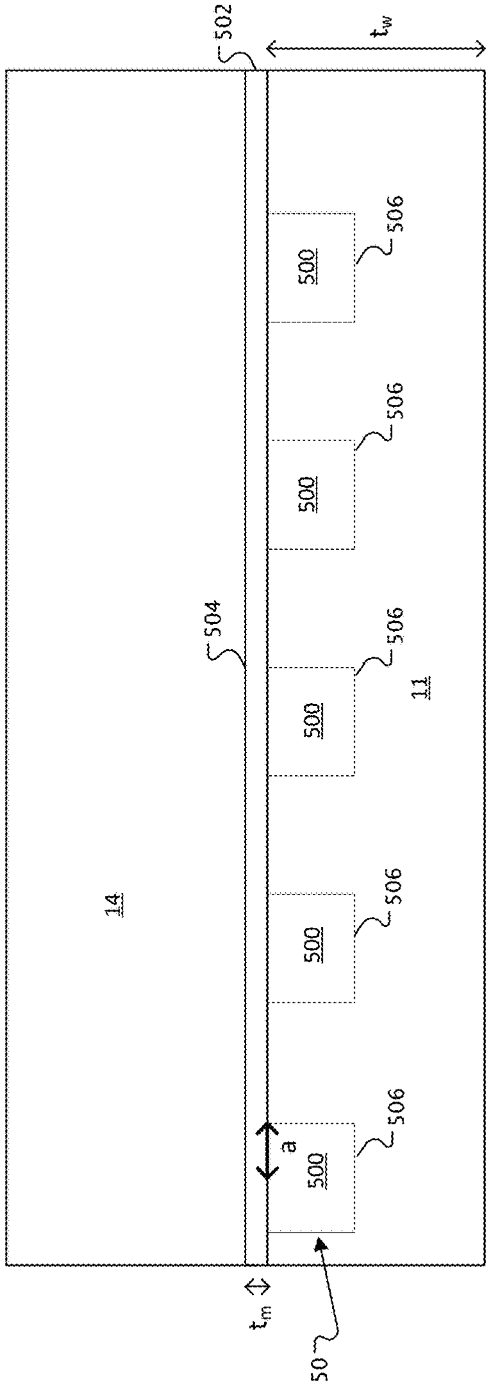

Referring to FIGS. 7A and 7B, in some embodiments, the compliant microstructures 50 formed in the nozzle layer 11 of the inlet feed channel 14 and/or the outlet feed channel 28 can be recesses 506 in the nozzle layer 11 that are covered by a thin membrane 502 to provide cavities 500. In some implementations, the membrane 520 is provided by the same layer that provides the membrane 300.

The membrane 502 is disposed over the recesses 506 such that an inner surface 504 of the nozzle layer 11 facing into the feed channel 14, 28 is substantially flat. In some cases, e.g., when a vacuum is present in the cavity 500, the membrane 502 can be slightly deflected into the cavity 500.

In some cases, the recesses 506 can be formed in the nozzle layer 11, which is also referred to as the bottom wall of the inlet or outlet feed channel 14, 28. In some cases, the recesses 506 can be formed in a top wall of the inlet or outlet feed channel, which is the wall opposite the bottom wall. In some cases, the recesses 506 can be formed in one or more side walls of the inlet or outlet feed channel 14, 28, which are the walls that intersect the top and bottom walls.

Without being limited to any particular theory, when a pressure fluctuation propagates into the feed channel 14, 28, the membrane 502 can deflect into or away from the recess 506, attenuating the pressure fluctuation and mitigating fluidic crosstalk among neighboring fluid ejectors 150 connected to that feed channel 14, 28. The deflection of the membrane 502 is reversible such that when the fluid pressure in the feed channel 14, 28 is reduced, the membrane 502 returns to its original configuration. Further details about these compliant microstructures 50 can be found in U.S. application Ser. No. 14/695,525, the contents of which are incorporated herein by reference in their entirety.

FIGS. 8A-8G show an example approach to fabricating the body 10 and nozzle layer 11 of the substrate 110. In this example, the substrate is fabricated to have fluid ejectors 150 with a membrane 300 in the fluid flow path before the intersection between the outlet passage 26 and the descender 20. The membrane 300 can provide the filter 320. In addition, the substrate can be fabricated to have compliant microstructures that include one or more cavities 500 formed in the nozzle layer 11.

Fluid ejectors 150 having only the membrane 300 or only cavities 500 can be fabricated according to a similar approach. For example, to fabricate a fluid ejector without the cavities 500, one can simply omit the portions of the steps associated with formation of the recess 506 illustrated by FIG. 8B.

In this example, the substrate is fabricated to have a fluid ejector 150 having a membrane 300 in the fluid flow path before the intersection between the outlet passage 26 and the descender. In addition, the substrate can be fabricated to have one or more cavities 500 formed in the nozzle layer 11 to provide the compliant microstructures.

Figure 8A:
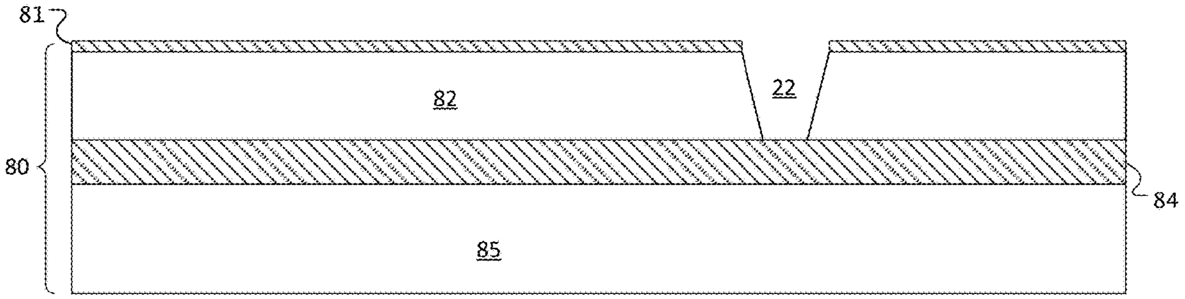
FIGS. 8A-8G are schematic cross-sectional views illustrating a method of fabricating a fluid ejector having a filter feature.
Figure 9:
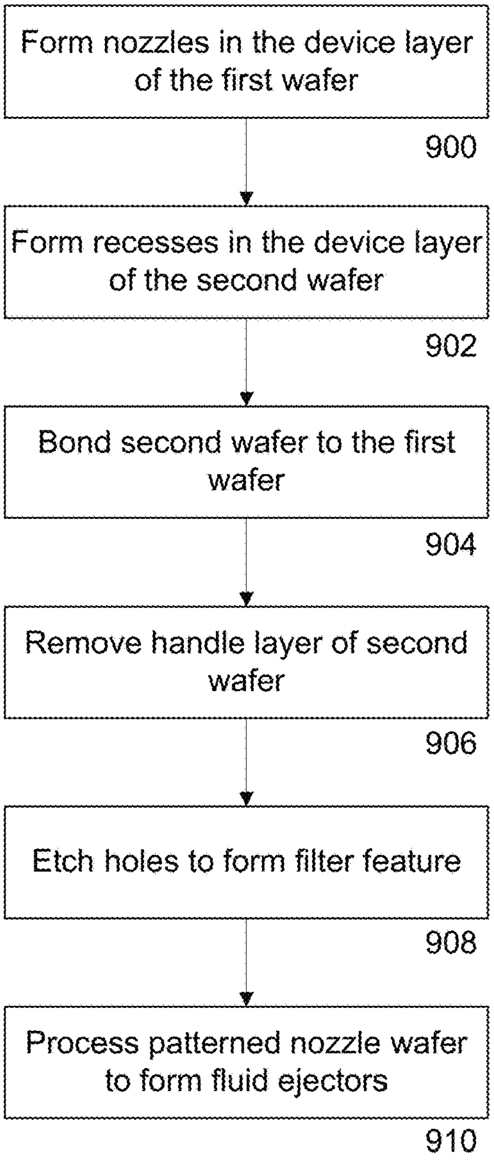
FIG. 9 is a flowchart for the method illustrated by FIGS. 8A-8G.

Referring to FIGS. 8A and 9, a first wafer 80 (e.g., a silicon wafer or a silicon-on-insulator (an) wafer) provides a nozzle wafer. The first wafer 80 includes a mask layer 81 (e.g., an oxide or nitride mask layer, such as $SiO_2$ or $Si_3N_4$), a device layer 82 (e.g., a silicon device layer 82), an etch stop layer 84 (e.g., an oxide or nitride etch stop layer), and a handle layer 85 (e.g., a silicon handle layer). In some examples, the first wafer 80 does not include the etch stop layer 84. In some examples, e.g., when the first wafer 80 is an SOI wafer, the insulator layer of the SOI wafer 80 acts as the etch stop layer 84.

To define the nozzle positions, the mask layer 81 is patterned and openings that will provide the nozzles 22 of the fluid ejectors 150 are formed through the device layer 82 (step 900), e.g., using standard microfabrication techniques including lithography and etching. For instance, a first layer of resist can be deposited onto the unpatterned mask layer 81 and lithographically patterned. The mask layer 81 can be etched to form openings through the mask layer 81. Then the device layer 82 can be etched using the mask layer 81 as the mask, e.g., with a deep reactive ion etch (DRIE), potassium hydroxide (KOH) etching, or another type of etching, to form the nozzles 22. The resist can be stripped before or after etching of the device layer 82.

Figure 8B:
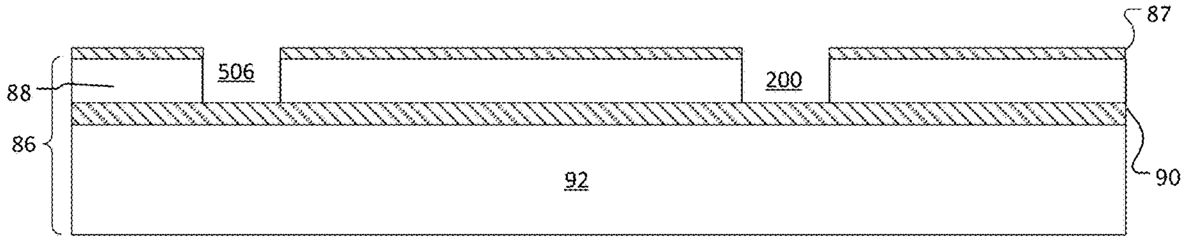

Referring to FIGS. 8B and 9, a second wafer 86 (e.g., a silicon wafer or an SOI wafer) includes a mask layer 87 (e.g., an oxide or nitride mask layer), a device layer 88 (e.g., a silicon device layer 88), an etch stop layer 90 (e.g., an oxide or nitride etch stop layer 90), and a handle layer 92 (e.g., a silicon handle layer 92). The device layer 88 of the second wafer 86 can be formed of the same material as the device layer 82 of the first wafer 80. In some examples, e.g., when the second wafer 86 is an SOI wafer, the insulator layer of the SOI wafer 86 acts as the etch stop layer 90.

To define the recesses 506, the mask layer 87 is patterned and recesses 506 are formed in the device layer 88 of the second wafer 86 (step 902), e.g., using standard microfabrication techniques including lithography and etching. For instance, a layer of resist can be deposited onto the unpatterned mask layer 87 and lithographically patterned. The mask layer 87 can be etched to form openings through the mask layer 87. Then the device layer 88 can be etched using the mask layer 87 as the mask. Although FIG. 8B illustrates the recess 506 as extending entirely through the device layer 88, this is not necessary; the recess 506 extend only partially through the device layer 88.

Figure 8C:
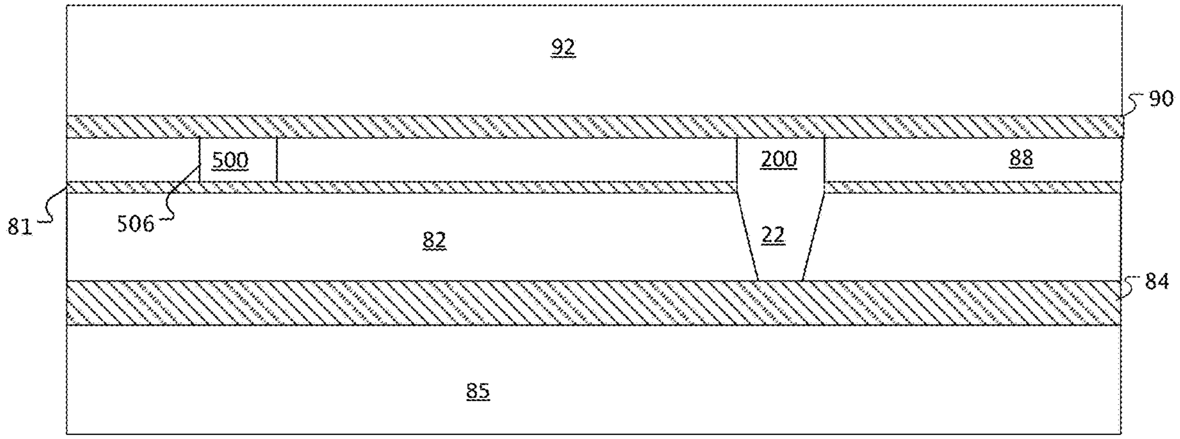

Referring to FIGS. 8C and 9, the second wafer 86 is bonded to the first wafer 80 (step 904), e.g., using thermal bonding or another wafer bonding technique, to form an assembly 96. In particular, the second wafer 86 is bonded to the first wafer 80 such that the mask layer side of the first wafer 80 is in contact with the mask layer side of the second wafer 86. The opening 200 can align with the opening that will provide the nozzle 22. Thus, the mask layer 81 can be bonded to the mask layer 87. In some implementations, the mask layer 81 and/or the mask layer 87 is removed before the second wafer 86 is bonded to the first wafer 80.

The etch stop layer 90 covers the recess 506. Thus, the etch stop layer 90 can provide the membrane 502 and define the cavity 500. Although only one recess 506 is shown in FIGS. 8B, there can be multiple recesses so as to form multiple cavities. In addition, although the cavity 500 shown in FIGS. 8F-8G is below the return channel 28, similar cavities can be formed in addition or alternatively below the supply channel 24 by forming the recesses in the appropriate locations.

Similarly, an opening 200 is formed entirely through the mask layer 87 and the device layer 88, e.g., using standard microfabrication techniques including lithography and etching, to provide a portion of the descender 20.

Figure 8D:
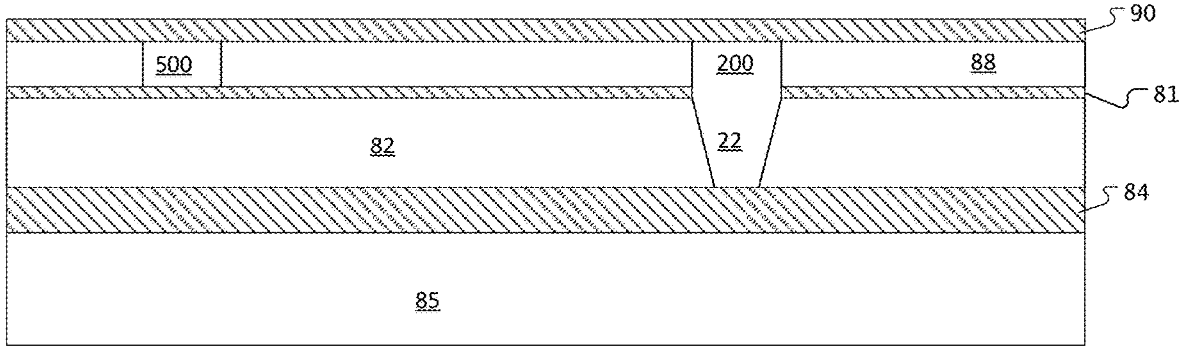

Referring to FIGS. 8D and 9, the handle layer 92 of the second wafer 86 is removed (step 906), e.g., by grinding and polishing, wet etching, plasma etching, or another removal process.

Figure 8E:
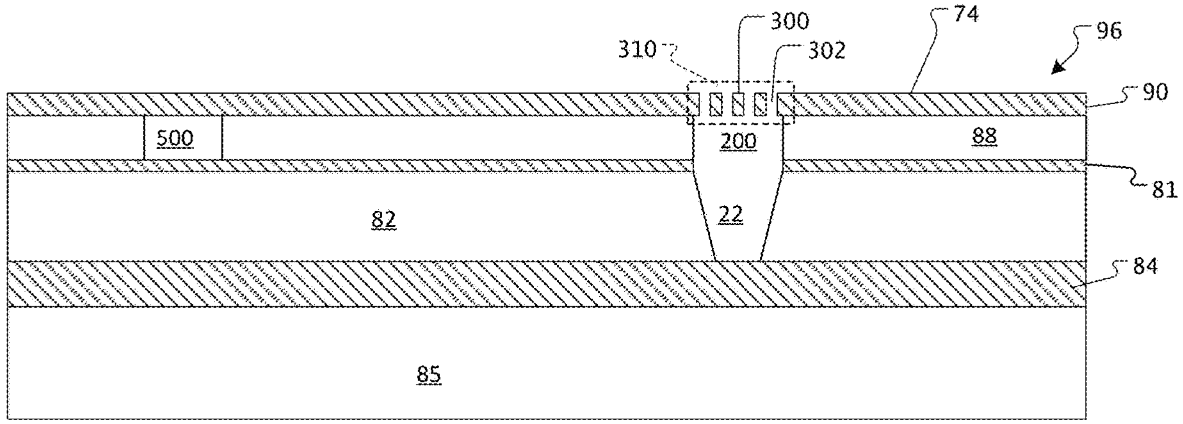
Figure 8F:
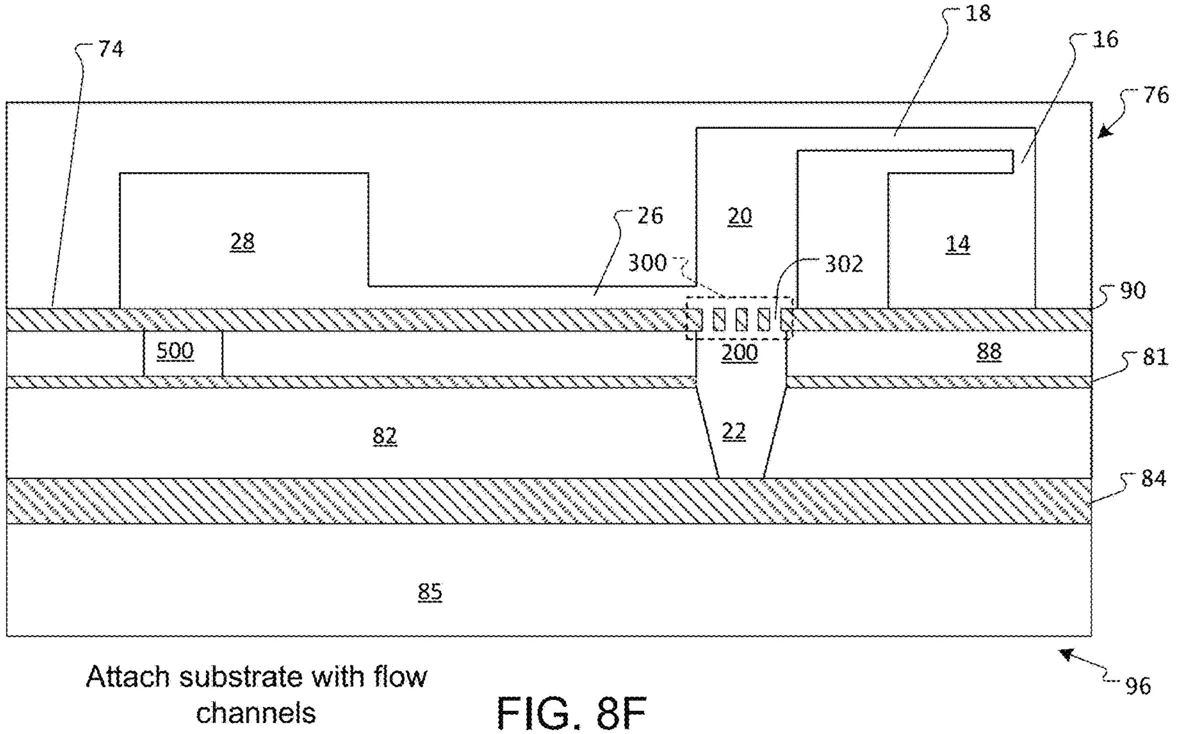
Figure 8G:
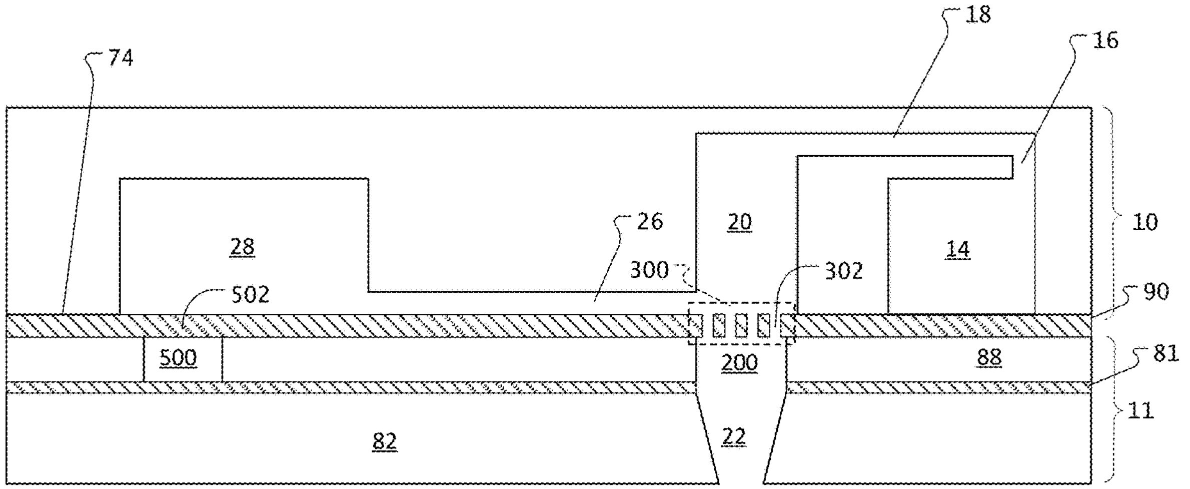

Referring to FIGS. 8E and 9, holes 302 are etched through the etch stop layer 90 to form the membrane 300, e.g., for filtering structure 320, that is positioned close to the nozzle 22 and in the flow path of fluid to the nozzle (see FIG. 3B) (step 908).

In the approach of FIGS. 8A-8E, the device layer 82, the mask layers 81, 87 (if present), and the device layer 88 together can form the nozzle layer 11. The approach of FIGS. 8A-8E provides a thick, robust nozzle layer 11 that is not thinned by the fabrication of the membrane 300.

The resulting assembly 96 with formed recesses 500, membranes 300, or both can be further processed (step 910) to form the fluid ejectors 150 of the printhead, e.g., as described below and in U.S. Pat. No. 7,566,118, the contents of which are incorporated herein by reference in their entirety.

For instance, referring to FIGS. 8F and 8G, a top surface 74 of the assembly 96, e.g., the exposed surface of the etch stop layer 90, can be bonded to a flow path wafer 76 (960). For instance, the top face 74 of the first wafer 60 can be bonded to the flow path wafer 76 using low-temperature bonding, such as bonding with an epoxy (e.g., benzocyclobutene (BCB)) or using low-temperature plasma activated bonding.

The flow path wafer 76 can be fabricated before bonding to have the flow passages 475, such as supply channel 14, chamber inlet passage 16, pumping chamber 18, descender 20, outlet passage 26 and outlet feed channel 28. Other elements such as actuators (not shown) can be formed before or after the assembly 96 is bonded to the flow path wafer 76.

Referring to FIG. 8G, after bonding, the handle layer 85 and etch stop layer 84 can be removed, e.g., by grinding and polishing, wet etching, plasma etching, or another removal process, to expose the nozzles 22. In some implementations, the etch stop layer 84 is not removed, but apertures are formed through the etch stop layer 84 to complete the nozzles. After the actuator is formed or attached, the resulting substrate generally corresponds to the substrate 110 shown in FIG. 3C.

As shown in FIG. 8G, the same layer 90 can provide the membrane 502 for the compliant microstructure (if present) and the membrane 300. Also as shown in FIG. 8G, with the outlet passage 26 formed as a recess in the bottom of the flow path wafer 76, the top surface 74 of the assembly 96 of the first and second wafers can provide the lower surface of the outlet passage 26. In addition, the top surface of the membrane 300 can be coplanar with the lower surface of the outlet passage 26.

FIGS. 11A-11G show another example approach to fabricating the body 10 and nozzle layer 11 of the substrate 110. In this example, the substrate is fabricated to have a fluid ejector 150 having a membrane 300 in the fluid flow path before the intersection between the outlet passage 26 and the descender 20. The membrane 300 can provide the filter 320.

In addition, the substrate can be fabricated to have one or more cavities 500 formed in the nozzle layer 11 to provide the compliant microstructures. A fluid ejector 150 having only a membranes 300 or only cavities 500 can be fabricated according to a similar approach. For example, to fabricate a fluid ejector without the cavities 500, one can simply begin as shown in FIG. 11A but with a substrate that lacks the recess 506.

Figure 11A:
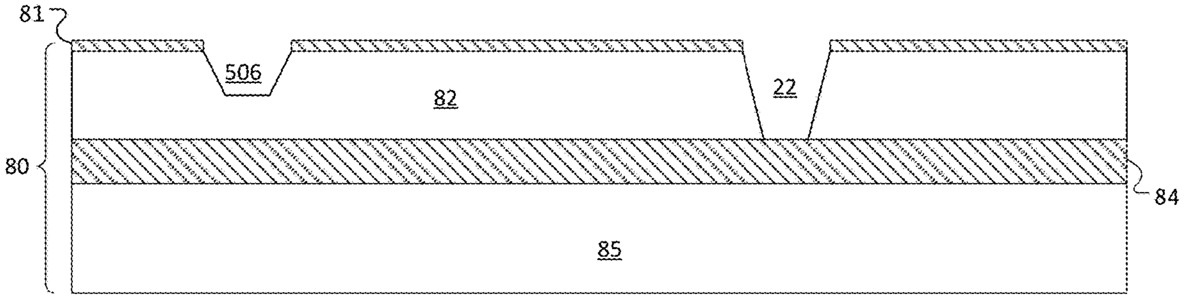
FIGS. 11A-11G are schematic cross-sectional views illustrating a method of fabricating another implementation of fluid ejector having a filter feature.
Figure 12:
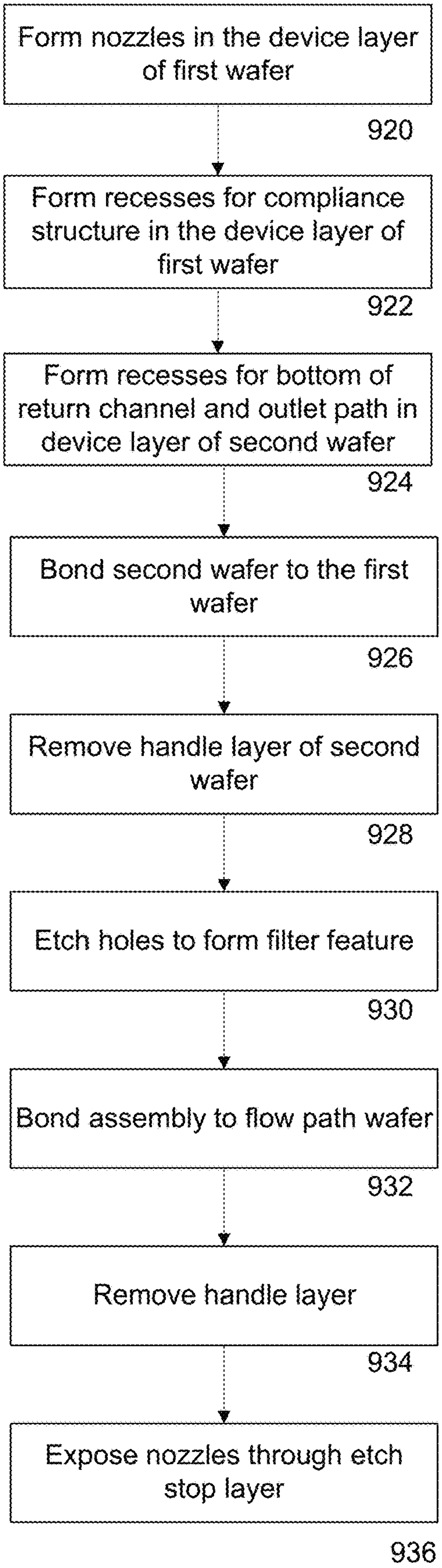
FIG. 12 is a flowchart is a flowchart for the method illustrated by FIGS. 11A-11G.

Referring to FIGS. 11A and 12, a first wafer 80 (e.g., a silicon wafer or an SOI wafer) includes a mask layer 81 (e.g., an oxide or nitride mask layer), a device layer 81 (e.g., a silicon nozzle layer 11), an etch stop layer 84 (e.g., an oxide or nitride etch stop layer), and a handle layer 85 (e.g., a silicon handle layer). The first wafer 80 can be termed the nozzle wafer. In some examples, the first wafer 80 does not include the etch stop layer 84. In some examples, e.g., when the first wafer 80 is an SOI wafer, the insulator layer of the SOI wafer acts as the etch stop layer 84.

To define the nozzle positions, the mask layer 81 is patterned and openings that will provide the nozzles 22 of the fluid ejectors 150 are formed through the device layer 82 (step 920), e.g., using standard microfabrication techniques including lithography and etching. For instance, a first layer of resist can be deposited onto the unpatterned mask layer 81 and lithographically patterned. The mask layer 81 can be etched to form openings through the mask layer 81. Then the device layer 82 can be etched using the mask layer 81 as the mask, e.g., with a deep reactive ion etch (DRIE), potassium hydroxide (KOH) etching, or another type of etching, to form the nozzles 22. The first layer of resist can be stripped.

Optionally, recesses 506 that extend partially, but not entirely, through the device layer 82 are also formed (step 922), e.g., using standard microfabrication techniques. If recesses 506 are to be formed, a second layer of resist can be deposited onto the mask layer 81 and lithographically patterned. The mask layer 81 and the device layer 82 can be etched according to the patterned resist to form the recesses 506, e.g., using a wet etch or dry etch.

Figure 11B:
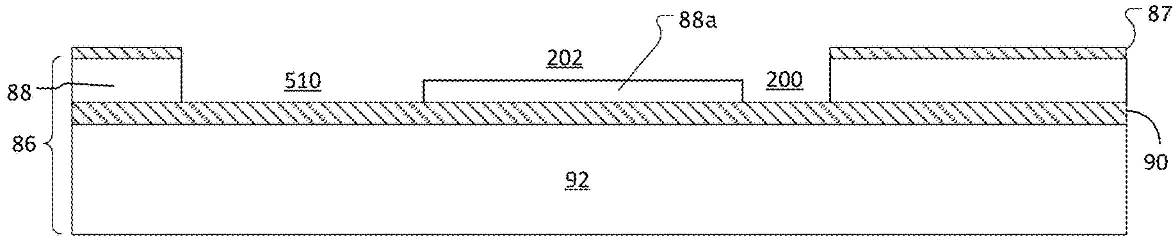

Referring to FIGS. 11B and 12, a second wafer 86 (e.g., a silicon wafer or an SOI wafer) has a handle layer 92, an etch stop layer 90 (e.g., an oxide or nitride etch stop layer), and a device layer 88. In some examples, e.g., when the second wafer 86 is an SOI wafer, the insulator layer of the SOI wafer 86 acts as the etch stop layer 90.

An opening 200 is formed entirely through the mask layer 87 and the device layer 88, e.g., using standard microfabrication techniques including lithography and etching, to provide a portion of the descender 20. To define the opening 200, the mask layer 87 is patterned and opening 200 is formed in the device layer 88 of the second wafer 86, e.g., using standard microfabrication techniques including lithography and etching. For instance, a layer of resist can be deposited onto the unpatterned mask layer 87 and lithographically patterned. The mask layer 87 can be etched to form openings through the mask layer 87. Then the device layer 88 can be etched using the mask layer 87 as the mask.

An opening 510 can be formed, by a similar or the same process, entirely through the mask layer 87 and the device layer 88 to provide a portion of the return channel 28 (step 924).

In addition, a recessed area 202 can be formed in the top surface of the device layer 88 between the opening 200 and the opening 510 to provide the outlet passage 26 (step 924). The recessed area 202 can extend partially, but not entirely, through the device layer 88, leaving a portion 88*a* of the device layer 88 below the recessed area 202. Thus, the openings 200 and 510 can be deeper than the recessed area 202. Alternatively, the recessed area 202 can extend entirely through the device layer 88.

Figure 11C:
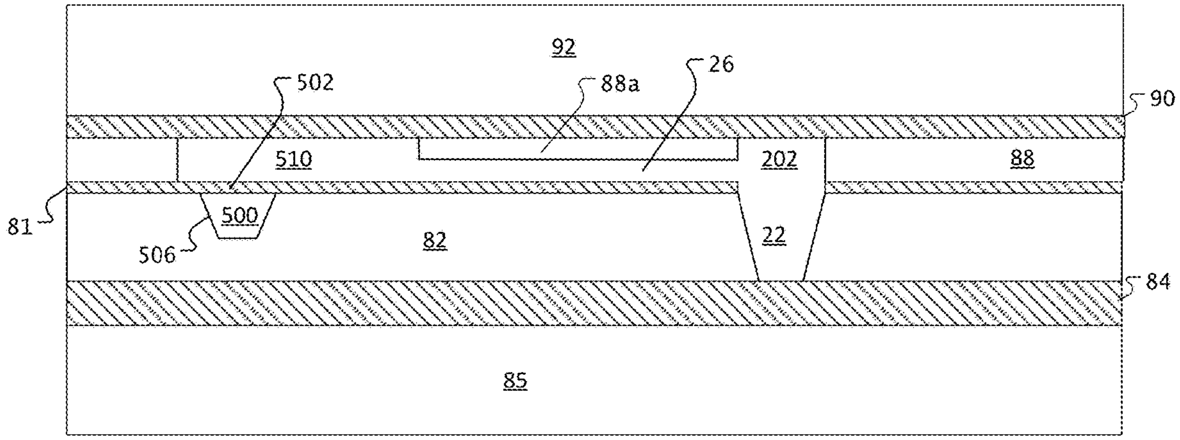

Referring to FIGS. 11C and 12, the second wafer 86 is bonded to the first wafer 80 (step 926), e.g., using thermal bonding or another wafer bonding technique) to form an assembly 96. In particular, the second wafer 86 is bonded to the first wafer 80 such that the mask layer side of the first wafer 80 is in contact with the mask layer side of the second wafer 86. The opening 200 can align with the opening that will provide the nozzle 22. Thus, the mask layer 81 can be bonded to the mask layer 87. In some implementations, the mask layer 81 and/or the mask layer 87 is removed before the second wafer 86 is bonded to the first wafer 80.

The passage formed recessed area 202 between the top of the second wafer 86 and the portion 88*a* of the device layer 88 provides the outlet passage 26.

The etch stop layer 90 covers the recess 506. Thus, the etch stop layer 90 can provide the membrane 502 and define the cavity 500. Although only one recess 506 is shown in FIG. 11B, there can be multiple recesses so as to form multiple cavities 500. In addition, although the cavity 500 shown in FIGS. 11F-11G is below the return channel 28, similar cavities can be formed in addition or alternatively below the supply channel 24 by forming the recesses in the appropriate locations.

Figure 11D:
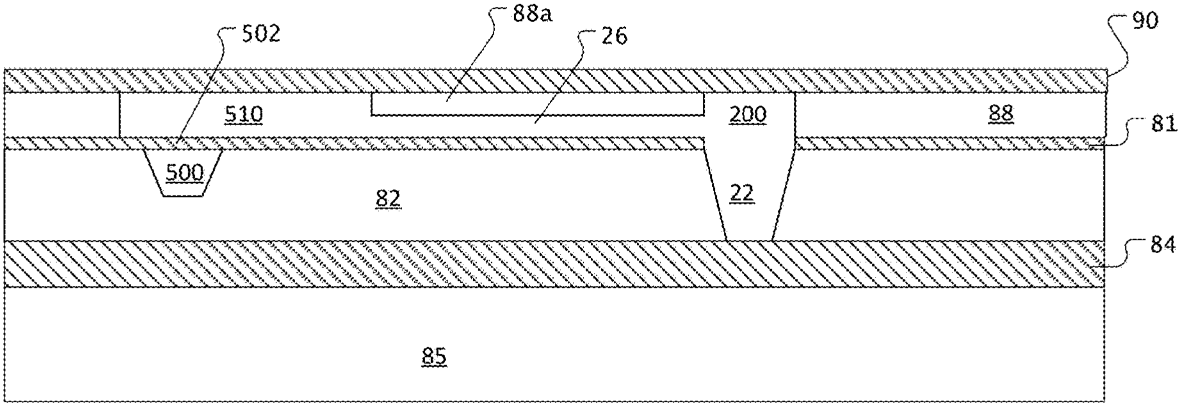

Referring to FIGS. 11D and 12, the handle layer 92 of the second wafer 86 is removed (step 928), e.g., by grinding and polishing, wet etching, plasma etching, or another removal process, leaving the etch stop layer 90 and the device layer 88.

Figure 11E:
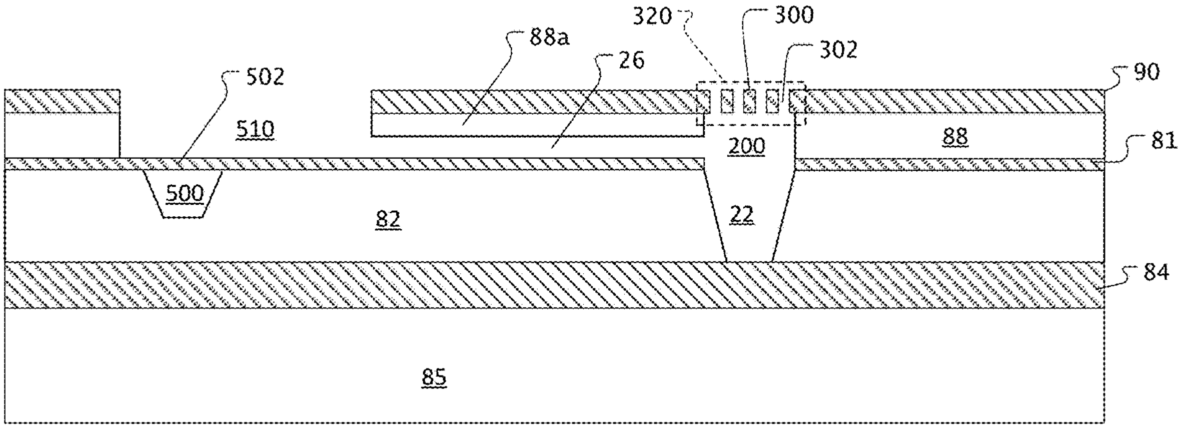
Figure 11F:
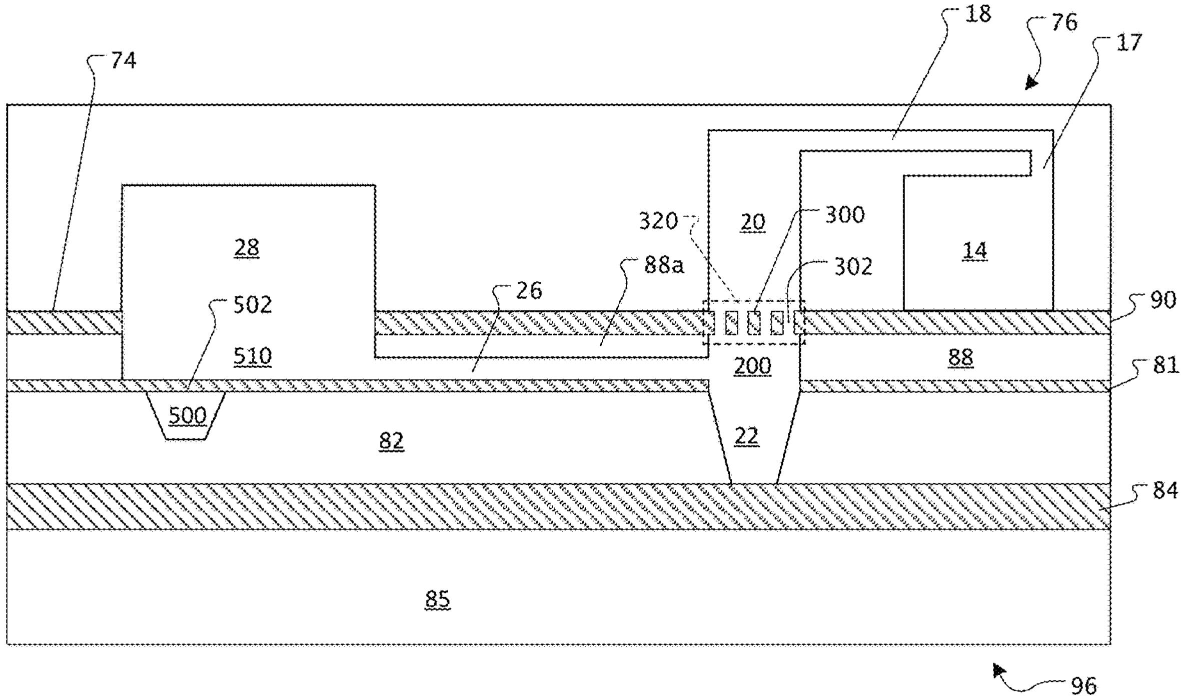
Figure 11G:
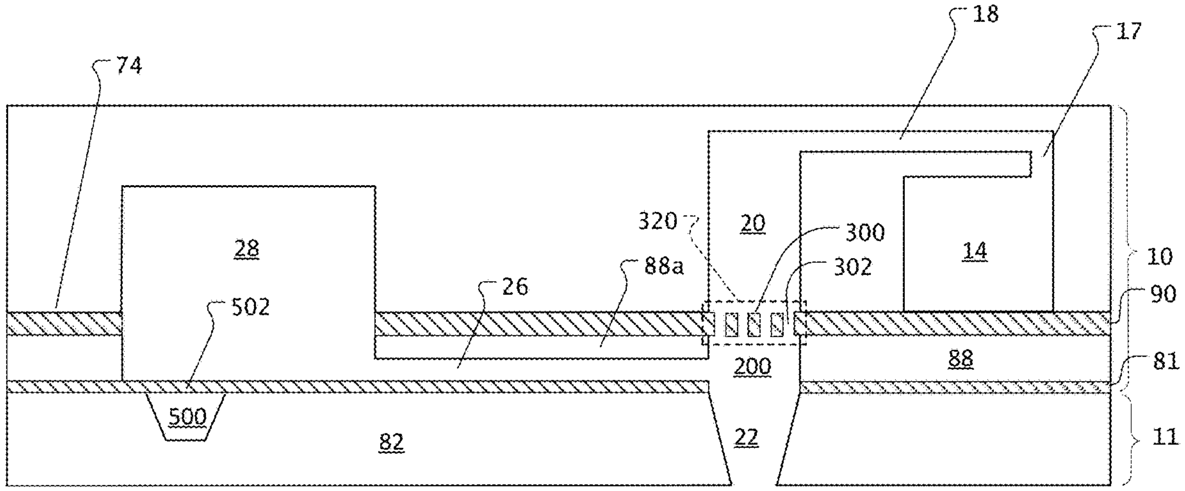

Referring to FIGS. 11E and 12, holes 302 are etched through the etch stop layer 90 (step 930). The portion of the etch stop layer 90 with the holes 302 thus forms the filter feature that is positioned close to the nozzle 22 and in the flow path of fluid to the nozzle. In addition, a hole is etched through the etch stop layer 90 above the opening 510. This exposes the opening 510 that will be the lower portion of the return channel 28.

The approach of FIGS. 11A-11E allows some control over the relative thickness of the membranes 300 and 502. That is, the membrane 300 and membrane 502 need not have the same thickness and/or composition, and the thickness and/or composition of each membrane can thus be selected for different purposes.

The wafer assembly 96 having nozzles 22, optional recesses 500 formed in the device layer 88, and a membrane 300 positioned close to the nozzles can be further processed, e.g., as described in U.S. Pat. No. 7,566,118, the contents of which are incorporated herein by reference in their entirety, to form the fluid ejectors 150 of the printhead 100.

For instance, referring to FIGS. 11F and 12, in some examples, a top surface 74 of the assembly 96, e.g., the exposed surface of the etch stop layer 90, can be bonded to a flow path wafer 76 (step 932). For instance, the top face 74 of the first wafer 60 can be bonded to the flow path wafer 76 using low-temperature bonding, such as bonding with an epoxy (e.g., benzocyclobutene (BCB)) or using low-temperature plasma activated bonding.

The flow path wafer 76 can be fabricated before bonding to have portions of the flow passages 475, such as supply channel 14, chamber inlet passage 16, pumping chamber 18, a portion of descender 20 (with the remainder provided by opening 200), and a portion of outlet feed channel 28 (with the remainder provided by opening 510). Other elements such as actuators (not shown) can be formed before or after the assembly 96 is bonded to the flow path wafer 76.

Referring to FIGS. 11G and 12, the handle layer 85 can then be removed (step 934), e.g., by grinding and polishing, wet etching, plasma etching, or another removal process. The etch stop layer 84, if present, is either removed (as shown in FIG. 11F) or masked and etched, e.g., using standard microfabrication techniques including lithography and etching, to expose the nozzles (step 936).

After the actuator is formed or attached, the resulting substrate generally corresponds to the substrate shown in FIG. 3D, although the bottom surface of the membrane 300 is spaced slightly above (by the thickness of the portion 88*a*) the intersection between the descender 20 and the outlet passage 26. On the other hand, if the recess 202 extends entirely through the device layer 88, then the bottom surface of the membrane 300 would be coplanar with the top surface of the outlet passage 26.

In the implementation shown in FIGS. 11A-11G, the outlet passage 26 is provided by the recess 202 in the device layer 88 rather than a recess in the wafer 76. Alternatively, the outlet passage 26 could be provided by a recess in the bottom surface of the flow path wafer 76 rather than the device layer 88. In this case, which is similar to FIGS. 8F-8G, the top surface of the etch stop layer 90 provides the bottom surface of the outlet passage 26.

FIGS. 13A-13G illustrate a process similar to that of FIGS. 8A-8G of fabricating the body 10 and nozzle layer 11 of the substrate 110. However, in this example, the holes 302 can pass through some or all of the device layer 88. Fabrication can proceed generally as described above for FIGS. 11A-11G, except as noted below.

Figure 13A:
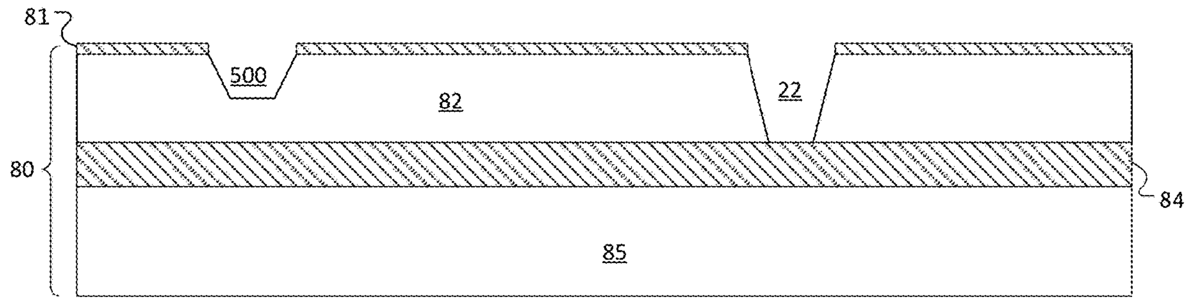
FIGS. 13A-13E are schematic cross-sectional views illustrating a method of fabricating an implementation of fluid ejector having an impedance feature.
Figure 13B:
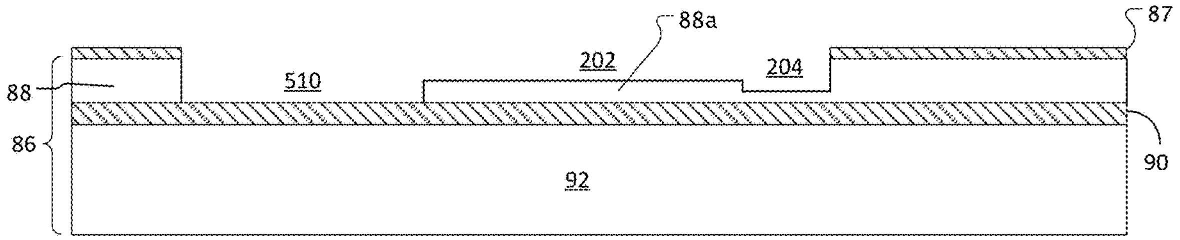
Figure 13C:
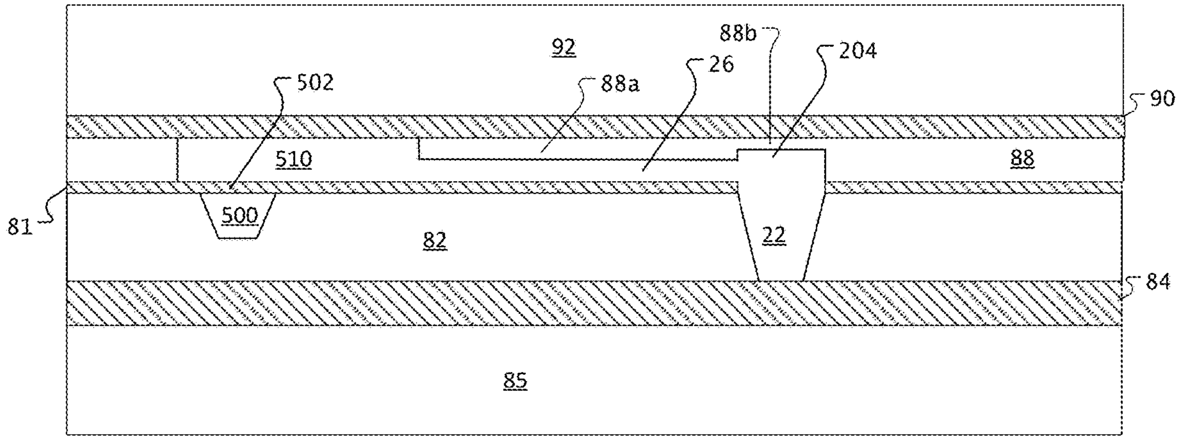
Figure 13D:
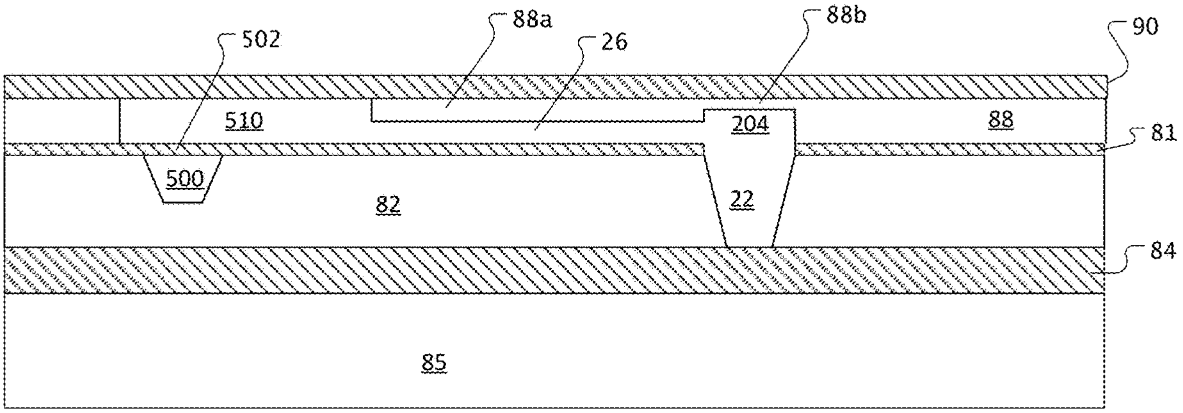

In particular, referring to FIG. 13B, rather than create an aperture 200 entirely through the device layer 88, a recessed area 204 is formed where the nozzle 22 will be located. This recessed area 204 can be the same depth as the recessed area 202 that will provide the outlet passage 26, or deeper. As shown by FIG. 13C-D, this leaves a thin portion 88*b* of the device layer 88 that will overlie the nozzle 22 when the first wafer is bonded to the second wafer.

Figure 13E:
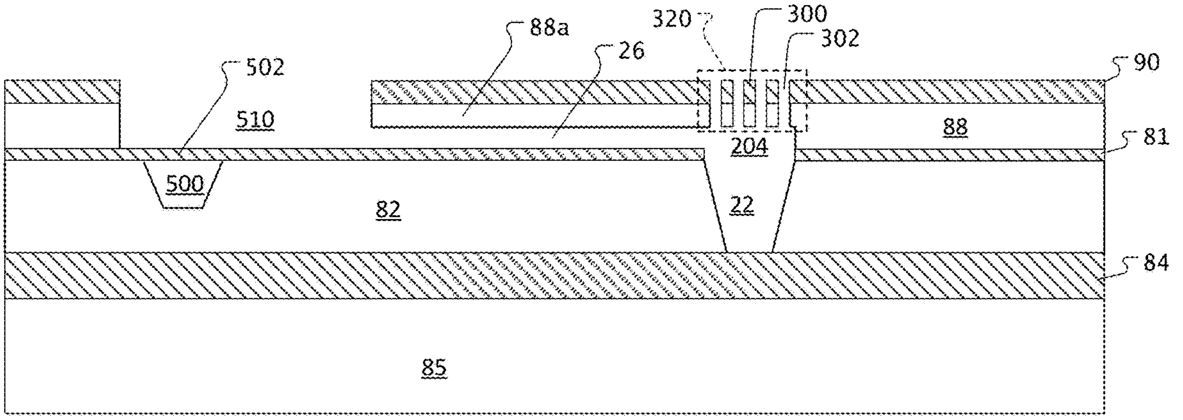

Referring to FIG. 13E, after openings are formed in the etch stop layer 90, the etch stop layer 90 can be used as a mask, and openings can be etched through the thin portion 88*b* of the device layer 88, e.g., by reactive ion etching, until the recess 204 is exposed. The resulting openings through both the etch stop layer 90 and the thin portion 88*b* of the device layer 88 provide the holes 302 through the membrane. Fabrication can then proceed as shown in FIGS. 11F-11G. An advantage of this approach is that it permits selection of the thickness of the membrane 300

After the actuator is formed or attached, the resulting substrate generally corresponds to the substrate shown in FIG. 3D. If the recessed area 204 has the same depth as the recessed area 202, then the bottom surface of the membrane 300 will be coplanar with the top surface of the outlet passage 26.

Figure 14A:
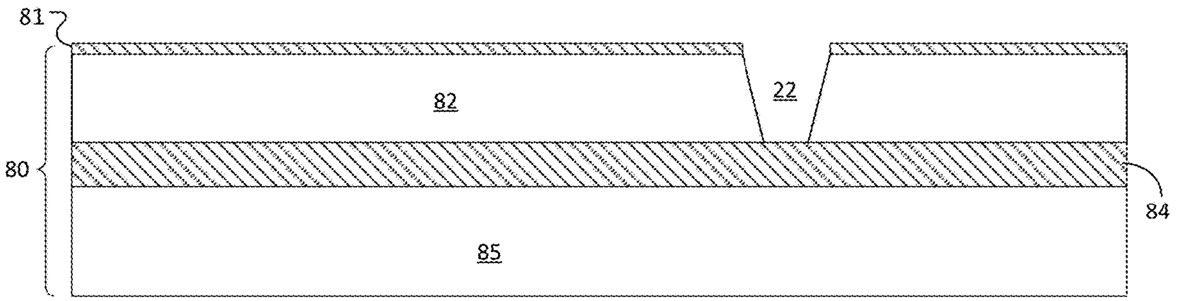
FIGS. 14A-14G are schematic cross-sectional views illustrating a method of fabricating another implementation of fluid ejector having an impedance feature.
Figure 14B:
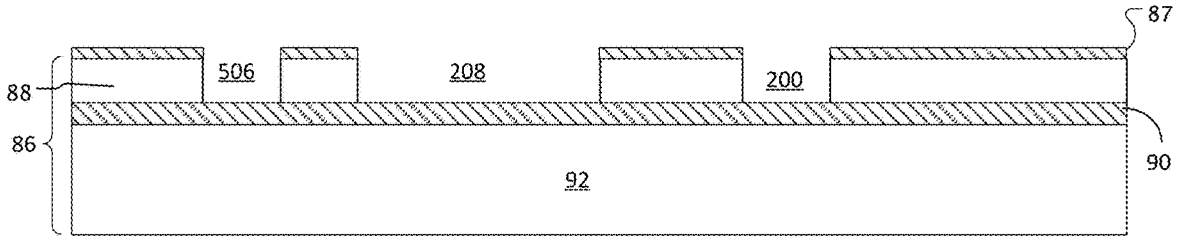
Figure 14C:
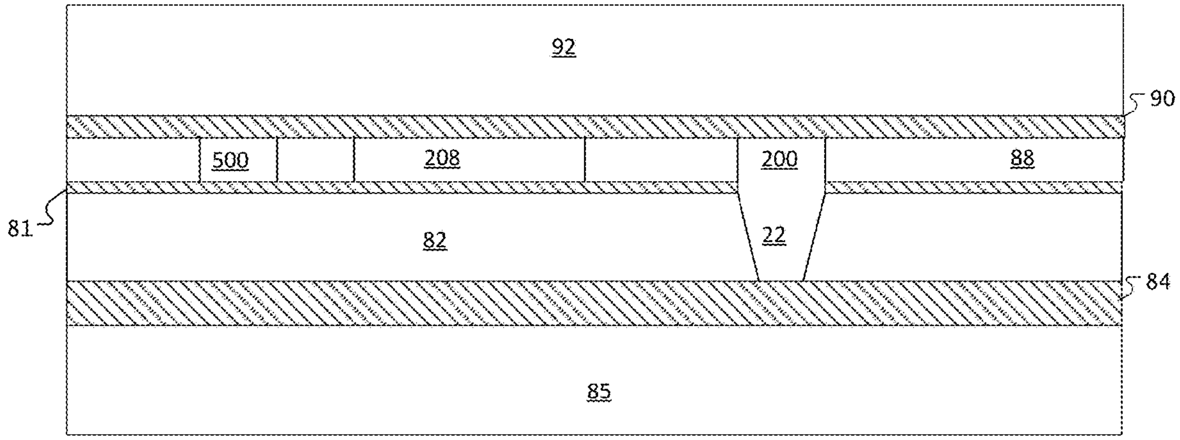
Figure 14D:
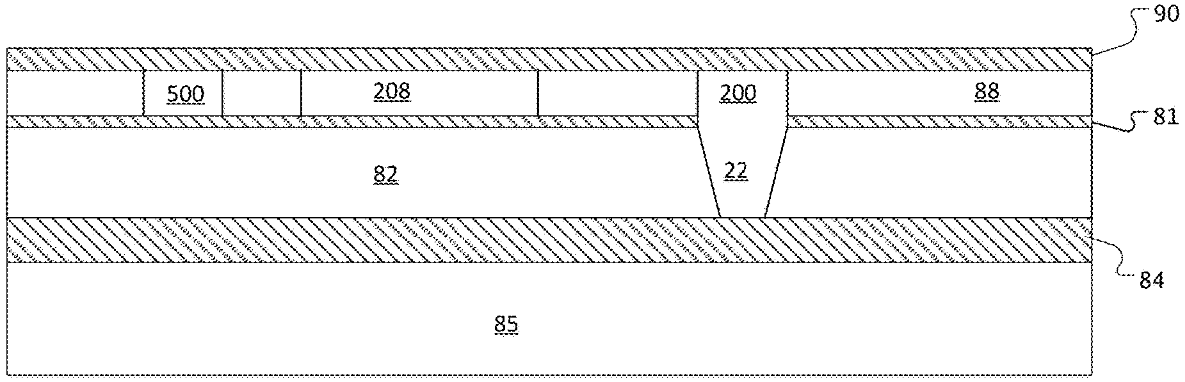
Figure 14E:
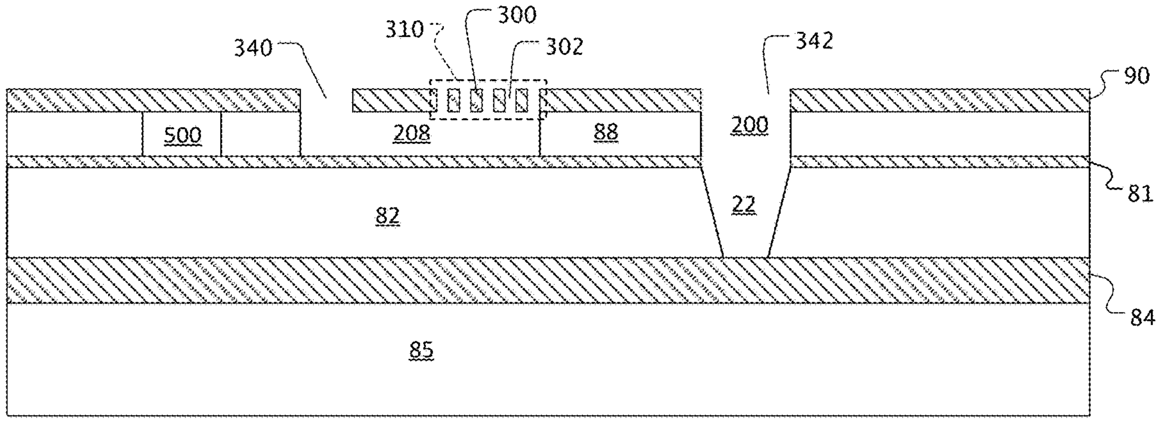
Figure 14F:
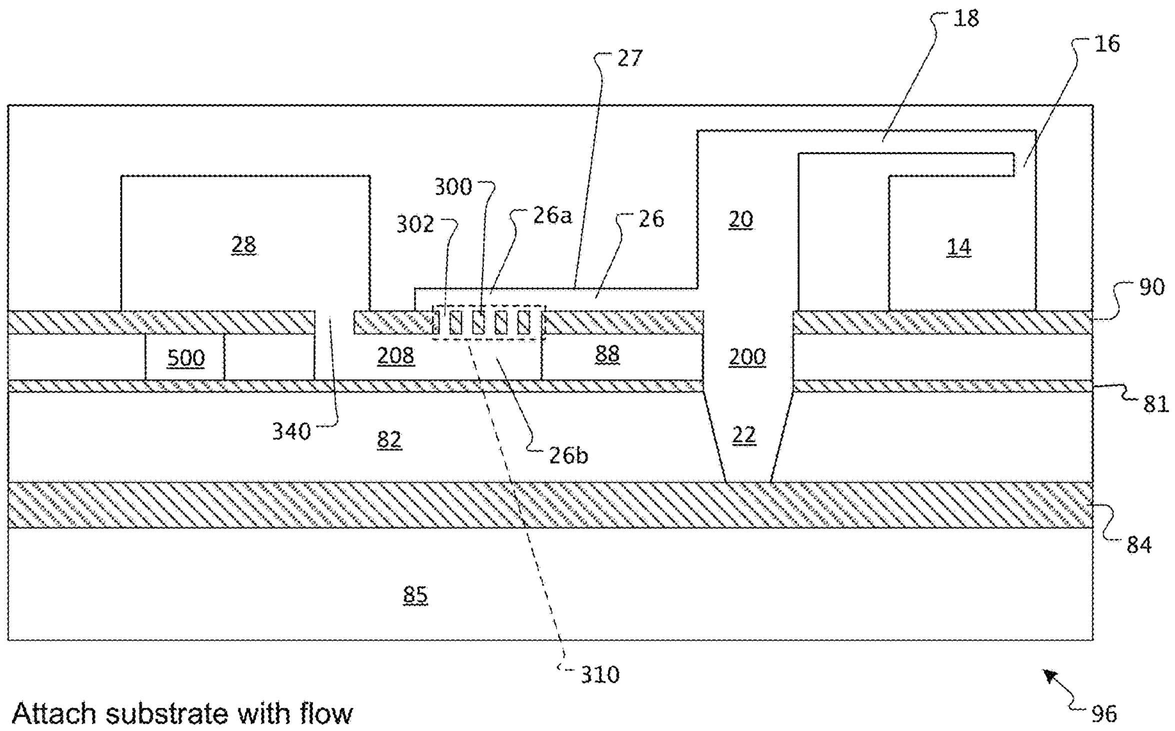
Figure 14G:
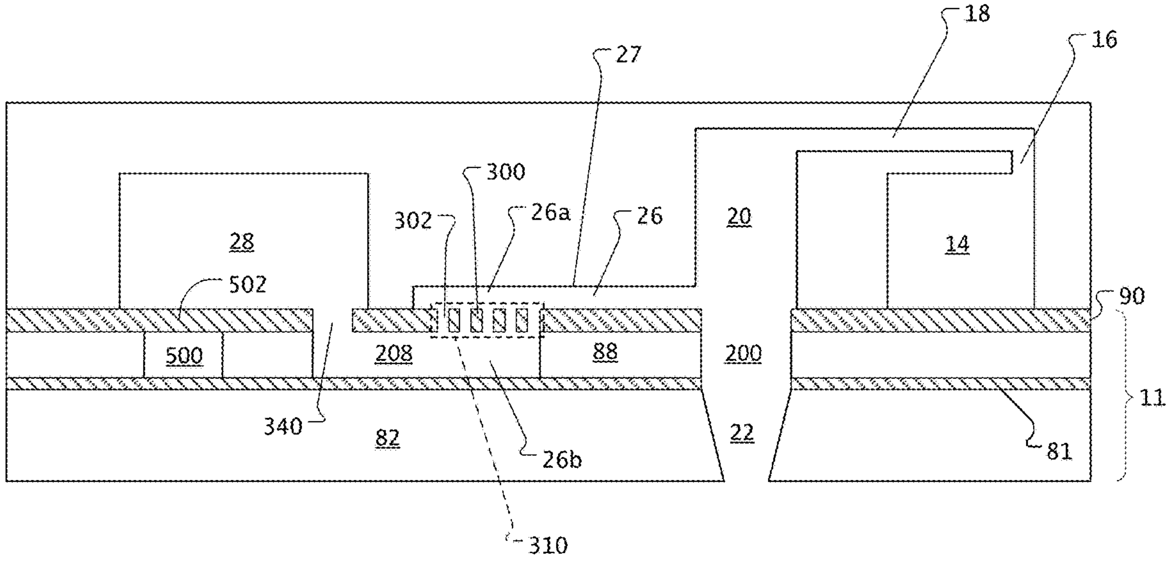

FIGS. 14-14G show another example approach to fabricating the body 10 and nozzle layer 11 of the substrate 110. In this example, the substrate is fabricated to have fluid ejectors 150 with a membrane 300 in the outlet passage 26. In particular, the membrane 300 can be in the outlet passage 26 at a position spaced away from both the descender 20 and the return channel 28. The membrane can provide the impedance structure 310.

The substrate can also include compliant microstructures that include one or more cavities 500 formed in the nozzle layer 11. Fluid ejectors 150 having only the membrane 300 can be fabricated according to a similar approach. For example, to fabricate a fluid ejector without the cavities 500, one can simply omit the portions of the steps associated with formation of the recess 506 illustrated by FIG. 14B.

Figure 15:
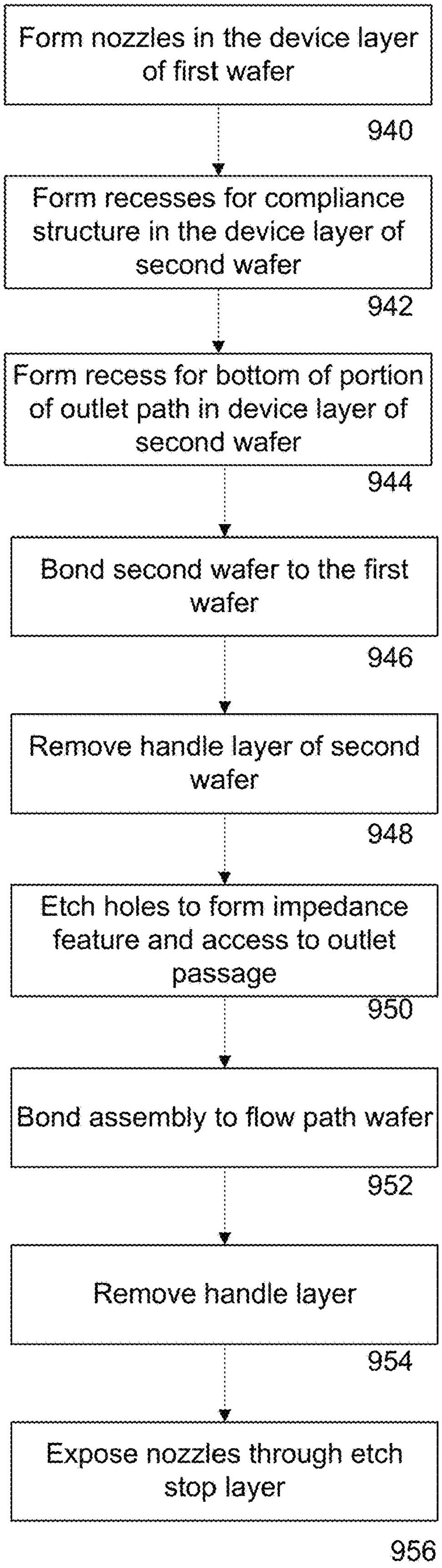
FIG. 15 is a flowchart for the method illustrated by FIGS. 14A-14G.

Referring to FIGS. 14A and 15, a first wafer 80 (e.g., a silicon wafer or a silicon-on-insulator (an) wafer) provides a nozzle wafer. The first wafer 80 includes a mask layer 81 (e.g., an oxide or nitride mask layer, such as $SiO_2$ or $Si_3N_4$), a device layer 82 (e.g., a silicon device layer 82), an etch stop layer 84 (e.g., an oxide or nitride etch stop layer), and a handle layer 85 (e.g., a silicon handle layer). In some examples, the first wafer 80 does not include the etch stop layer 84. In some examples, e.g., when the first wafer 80 is an SOI wafer, the insulator layer of the SOI wafer 80 acts as the etch stop layer 84.

To define the nozzle positions, the mask layer 81 is patterned and openings that will provide the nozzles 22 of the fluid ejectors 150 are formed through the device layer 82 (step 940), e.g., using standard microfabrication techniques including lithography and etching. For instance, a first layer of resist can be deposited onto the unpatterned mask layer 81 and lithographically patterned. The mask layer 81 can be etched to form openings through the mask layer 81. Then the device layer 82 can be etched using the mask layer 81 as the mask, e.g., with a deep reactive ion etch (DRIE), potassium hydroxide (KOH) etching, or another type of etching, to form the nozzles 22. The resist can be stripped before or after etching of the device layer 82.

Referring to FIGS. 14B and 15, a second wafer 86 (e.g., a silicon wafer or an SOI wafer) includes a mask layer 87 (e.g., an oxide or nitride mask layer), a device layer 88 (e.g., a silicon device layer 88), an etch stop layer 90 (e.g., an oxide or nitride etch stop layer 90), and a handle layer 92 (e.g., a silicon handle layer 92). The device layer 88 of the second wafer 86 can be formed of the same material as the device layer 82 of the first wafer 80. In some examples, e.g., when the second wafer 86 is an SOI wafer, the insulator layer of the SOI wafer 86 acts as the etch stop layer 90.

To define the cavities 500, the mask layer 87 is patterned and recesses 506 are formed in the device layer 88 of the second wafer 86 (step 942), e.g., using standard microfabrication techniques including lithography and etching. Although FIG. 14B illustrates the recess 510 as extending entirely through the device layer 88, this is not necessary; the recess 500 can extend only partially through the device layer 88.

An opening is formed in the mask layer 87 and optionally a recess 200 is formed at least partially through the device layer 88, e.g., using standard microfabrication techniques including lithography and etching. This recess 200 will be below the outlet passage 26, and could be considered to provide a portion of the descender 20 or the nozzle 22. FIG. 14B illustrates the recess 200 as an opening extending entirely through the device layer 88, but this is not necessary; the recess 200 can extend only partially through the device layer 88.

Similarly, an opening is formed in the mask layer 87 and a recess 208 is formed at least partially through the device layer 88 (step 944). This recess will provide a portion of the outlet passage 26. FIG. 14B illustrates the recess 208 as extending entirely through the device layer 88, but is not necessary; the recess 208 can extend only partially through the device layer 88. However, the recess 200 should be at least as deep as the recess 208.

The recess 506 (if present), opening 200 and recess 208 can be formed simultaneously in a single etching step. In this case, the recess 510 (if present), opening 200 and recess 208 would all have the same depth. For example, a layer of resist can be deposited onto the unpatterned mask layer 87 and lithographically patterned. The mask layer 87 can be etched to form openings through the mask layer 87. Then the device layer 88 can be etched using the mask layer 87 as the mask.

On the other hand, to provide the recess 510 (if present), opening 200 and recess 208 with different depths, multiple etching steps can be used. For example, for each feature a layer of resist can be deposited and lithographically patterned, and the substrate then subjected to an etching step (the resist can cover previously defined features to protect them from subsequent etching steps). In some implementations, the photoresist itself can be used as the mask.

Referring to FIGS. 14C and 15, the second wafer 86 is bonded to the first wafer 80 (step 946), e.g., using thermal bonding or another wafer bonding technique, to form an assembly 96. In particular, the second wafer 86 is bonded to the first wafer 80 such that the mask layer side of the first wafer 80 is in contact with the mask layer side of the second wafer 86. Thus, the mask layer 81 can be bonded to the mask layer 87. In some implementations, the mask layer 81 and/or the mask layer 87 is removed before the second wafer 86 is bonded to the first wafer 80. The opening 200 can align with the opening that will provide the nozzle 22. When the recess 510 is covered by the etch stop layer 90 if forms the cavity 500.

The etch stop layer 90 covers the recess 506. Thus, the etch stop layer 90 can provide the membrane 502 and define the cavity 500. Although only one recess 506 is shown in FIG. 14B, there can be multiple recesses so as to form multiple cavities 500. In addition, although the cavity 500 shown in FIGS. 14F-14G is below the return channel 28, similar cavities can be formed in addition or alternatively below the supply channel 24 by forming the recesses in the appropriate locations.

Referring to FIGS. 14D and 15, the handle layer 92 of the second wafer 86 is removed (step 948), e.g., by grinding and polishing, wet etching, plasma etching, or another removal process.

Referring to FIGS. 14E and 15, holes 302 are etched through the etch stop layer 90 until the recess 208 is reached (step 950) to form the impedance feature 300. The holes 302 can be formed by an etching process such as wet etching or plasma etching. In particular, the holes 302 can be formed by an anisotropic etch, e.g., a reactive ion etch.

In addition, an aperture 340 can be formed through the etch stop layer 90 until the recess 208 is reached to provide an opening between the outlet passage 26 and the return channel 28 (step 950).

In addition, an aperture 342 can be formed through the etch stop layer 90 until the recess 200 is reached to provide an opening between the descender 20 and the nozzle 22.

The openings 302, opening 340 and opening 342 can be formed simultaneously in a single etching step. In particular, the openings can be formed by an anisotropic etch, e.g., a reactive ion etch.

Figure 16A:
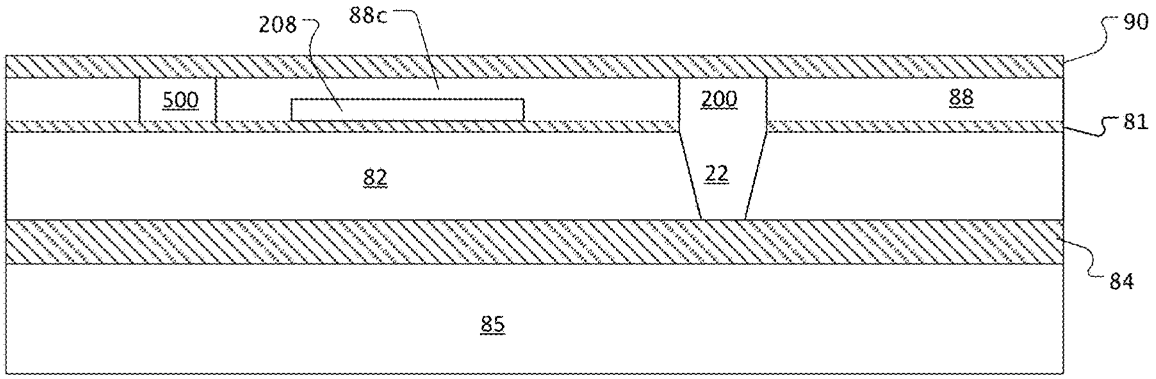
FIGS. 16A-16C are schematic cross-sectional views illustrating a method of fabricating still another implementation of fluid ejector having an impedance feature.
Figure 16B:
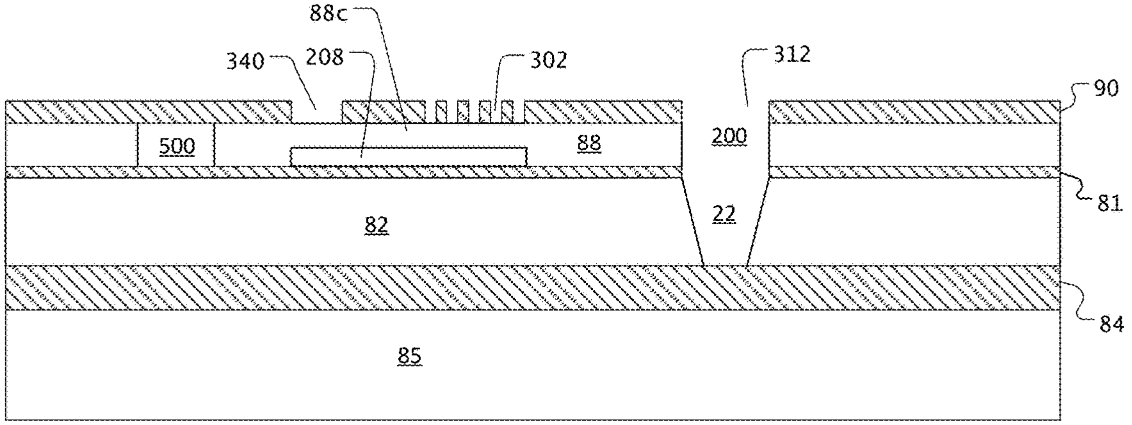
Figure 16C:
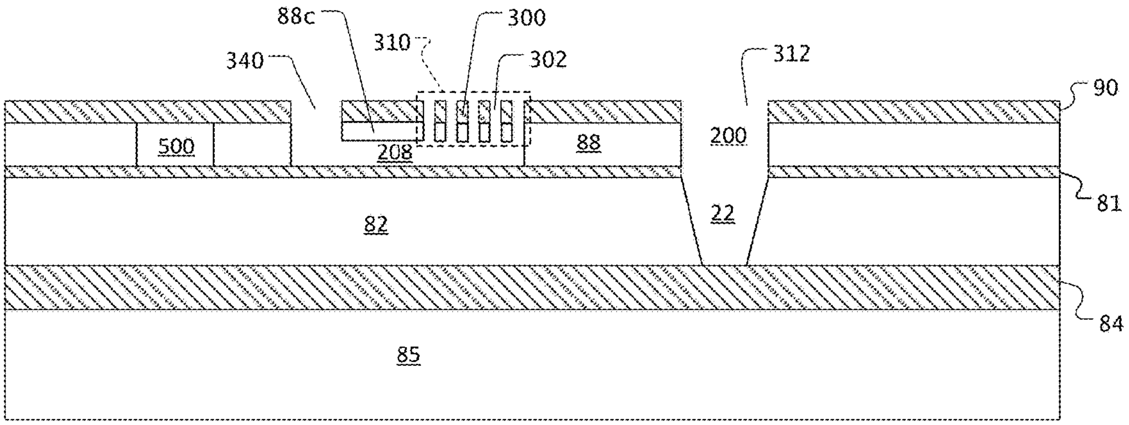

Referring to FIGS. 16A-16C, if the recess 208 did not extend entirely through the device layer 88, then a further etching step can be performed, e.g., using the etch stop layer 90 as a mask. Openings 302 and 340 can be etched through a thin portion 88*c* of the device layer 88 above the recess 208, e.g., by reactive ion etching, until the recess 208 is exposed. An advantage of this approach is that it permits selection of the thickness of the membrane 300, e.g., by selecting the depth of the recess 208. The aspect shown in FIGS. 16A-16C can be combined with the various alternatives.

Assuming that the recess 208 extends entirely through the device layer 88 as shown in FIG. 14E, then the portion of the etch stop layer 90 spanning the flow path 26 provides the membrane 300. On the other hand, if the recess 208 extends only partially through the device layer 88 as shown in FIG. 16B, then the combination of the etch stop layer 90 and the thin portion 88*c* of the device layer 88 provide the membrane 300.

In the approach of FIGS. 14A-14E, the device layer 82, the mask layers 81, 87 (if present), the device layer 88 and the etch stop layer 90 can provide the nozzle layer 11. The approach of FIGS. 14A-14E provides a thick, robust nozzle layer 11 that is not thinned by the fabrication of the membrane 304. The resulting assembly 96 with cavity 500 and/or membrane 300, can be further processed to form the fluid ejectors 150 of the printhead.

For instance, referring to FIGS. 14F and 14G, a top surface 74 of the assembly 96, e.g., the exposed surface of the etch stop layer 90, can be bonded to a flow path wafer 76 (step 952). The flow path wafer 76 can be fabricated before bonding to have the flow passages 475, such as supply channel 14, chamber inlet passage 16, pumping chamber 18, descenders 20, a portion of outlet passage 26, and outlet feed channel 28. For instance, the top face 74 of the first wafer 60 can be bonded to the flow path wafer 76 using low-temperature bonding, such as bonding with an epoxy (e.g., benzocyclobutene (BCB)) or using low-temperature plasma activated bonding. Other elements such as actuators (not shown) can be formed before or after the assembly 96 is bonded to the flow path wafer 76.

In the implementation shown in FIGS. 14A-14G, one portion of the outlet passage 26 is provided by the recess 208 in the device layer 88, and another portion of the outlet passage 26 is provided by a recess 27 in the bottom of the flow path wafer 76. The recess 27 in the bottom can extend from the descender 20. The recess 208 and the recess 27 overlap across the holes 302, so that the resulting membrane 300 divides the outlet passage 26 into a first region 26*a* above the membrane 304 and a second region 26*b* below the membrane.

Figure 17A:
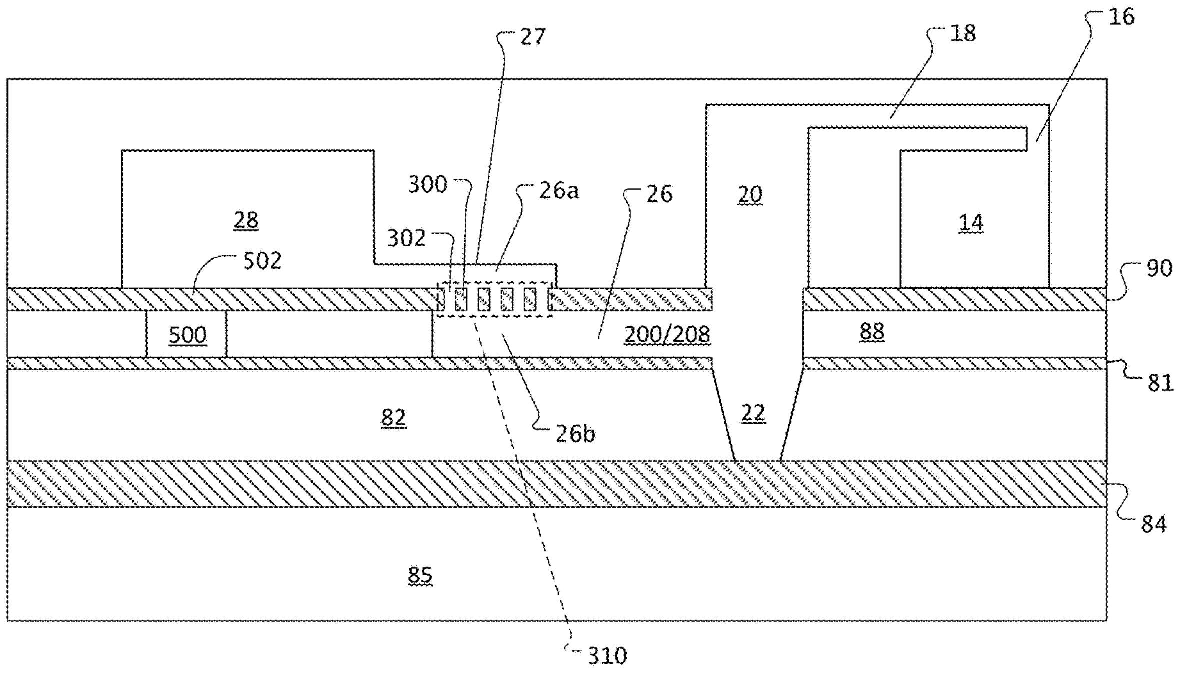
FIGS. 17A and 17B are schematic cross-sectional views illustrating even further implementations (during construction) of fluid ejector having an impedance feature.

Although the implementation shown in FIGS. 14A-14G has the upper portion 26*a* of the outlet passage 26 connected to the descender 20 and the lower portion 26*b* of the outlet passage connected to the return channel 28, this could be reversed as shown in FIG. 17A. For example, the recess 27 in the bottom of the flow path wafer 76 could extend from return channel 28, rather than the descender 20, to the openings 302. In addition, the recess 208 could be joined to (and be considered part of) the opening 200. Thus, the recess 208 can extend from the descender 20 to the opening 302.

Figure 17B:
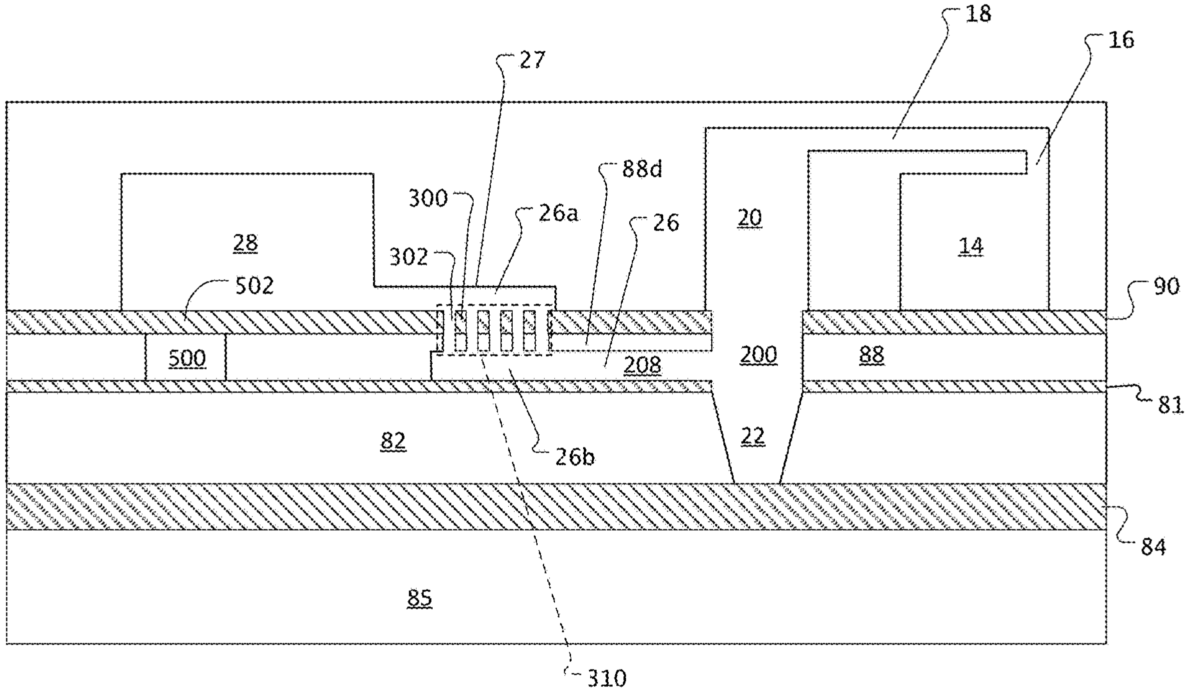

Moreover, the implementation shown in FIG. 17A could be combined with various other aspects. For example, as shown in FIG. 17B, the recess 208 can be formed so that it extends only partially through the device layer 88, and a further etching step can be performed, e.g., using the etch stop layer 90 as a mask. Thus, openings 302 are etched through a thin portion 88*d* of the device layer 88 above the recess 208, e.g., by reactive ion etching, until the recess 208 is exposed. As a result, the combination of the etch stop layer 90 and the thin portion 88*c* of the device layer 88 provide the membrane 300 of the impedance feature 310.

Referring to FIGS. 14G and 15, after bonding, the handle layer 85 and etch stop layer 84 can be removed (step 954), e.g., by grinding and polishing, wet etching, plasma etching, or another removal process, to expose the nozzles 22. In some implementations, the etch stop layer 84 is not removed, but apertures are formed through the etch stop layer 84 to complete the nozzles (step 956). After the actuator is formed or attached, the resulting substrate generally corresponds to the substrate shown in FIG. 3C.

As shown in FIG. 14G, the same layer 90 can provide the membrane 502 for the compliant microstructure (if present) and the membrane 300. Also as shown in FIG. 14G, with the outlet passage 26 formed as a recess in the bottom of the flow path wafer 76, the top surface 74 of the assembly 96 of the first and second wafers can provide the lower surface of the outlet passage 26. In addition, the top surface of the membrane 300 can be coplanar with the lower surface of the outlet passage 26. Similarly, the top surface of the membrane 300 can be coplanar with the lower surface of the return channel 28.

FIGS. 18A-18H illustrate a process similar to that of FIGS. 14-14G of fabricating the body 10 and nozzle layer 11 of the substrate 110. However, in this example, the openings 302 are located immediately below the return channel 28 rather than within the outlet passage 26. Fabrication can proceed generally as described above for FIGS. 14A-14G and 17A, except as noted below.

Figure 18A:
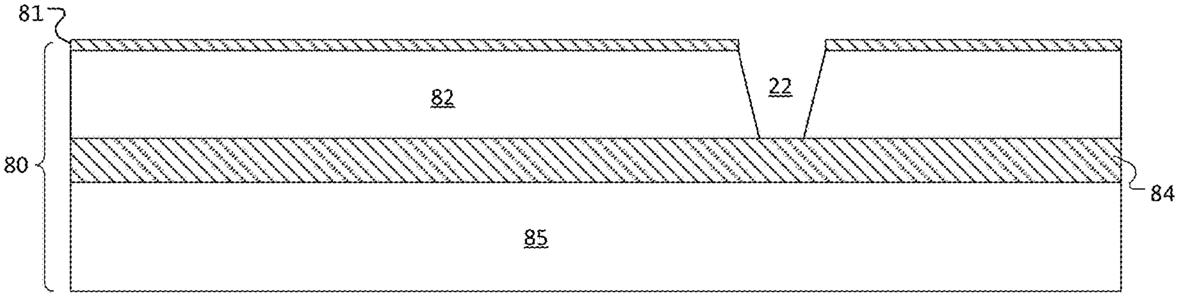
FIGS. 18A-18H are schematic cross-sectional views illustrating a method of fabricating yet another implementation of fluid ejector having an impedance feature.
Figure 18B:
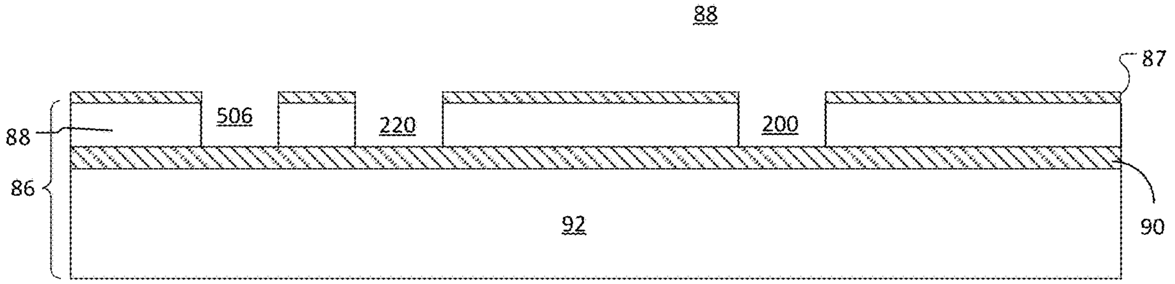

Referring to FIG. 18B, a first recess 200 is formed in the device layer 88 in a region corresponding to the nozzle 22. This recess 200 will be below the outlet passage 26, and could be considered to provide a portion of the descender 20 or the nozzle 22. A second recess 220 is formed in the device layer 88 in the region that will underlie a portion of the return channel 28. These recesses 200 and 220 can be formed by patterning the mask layer 87 and using it as a mask for etching the device layer 88.

Figure 18C:
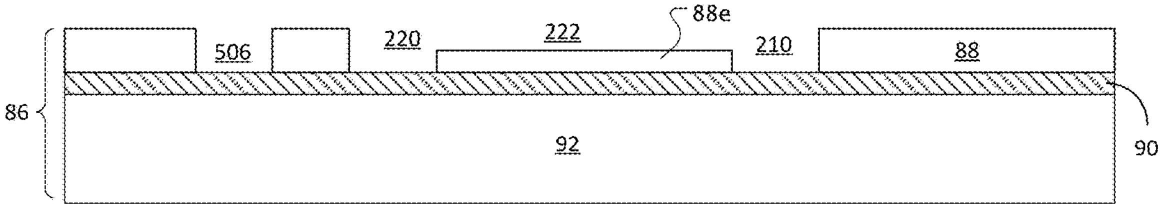

In addition, referring to FIG. 18C, a third recess 222 in the device layer 88 to connect the first recess 200 and the second recess 220. A portion 88*e* of the device layer 88 can remain below recess 222. The recess 222 can be formed by patterning the mask layer 87 and using it as a mask for etching the device layer 88. Optionally the mask layer 87 can be stripped from the entire wafer 86.

Although FIGS. 18B-18C illustrate the recess 200 and the recess 220 as openings extending entirely through the device layer 88, this is not necessary. The recess 200 and/or the recess 220 can extend only partially through the device layer 88. However, the recess 220 should at least as deep (i.e., the same or greater depth) as the recess 222. Similarly, although FIG. 18B illustrates the recess 222 as extending only partially through the device layer 88, this is not necessary. The recess 222 can extend entirely through the device layer 88. Where the recesses 200, 220, 222 are the same depth, they can be formed simultaneously in a single etching step. The relative depths of the recesses can be selected based on the needs for the height of the outlet passage 26 and thickness of the membrane 300, e.g., based desired resistance to fluid flow.

Figure 18D:
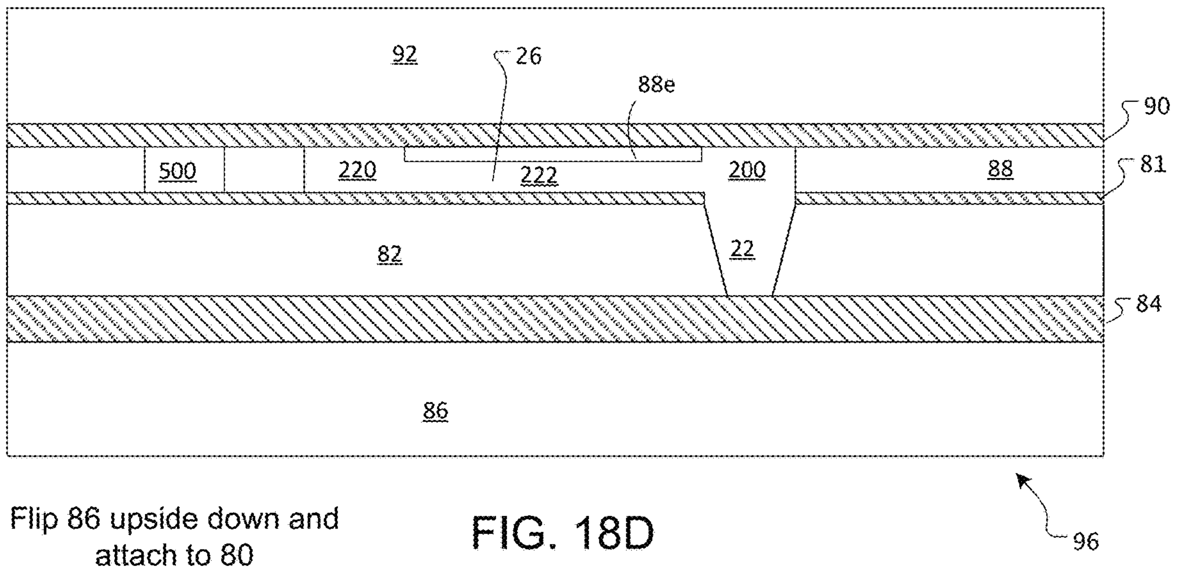
Figure 18E:
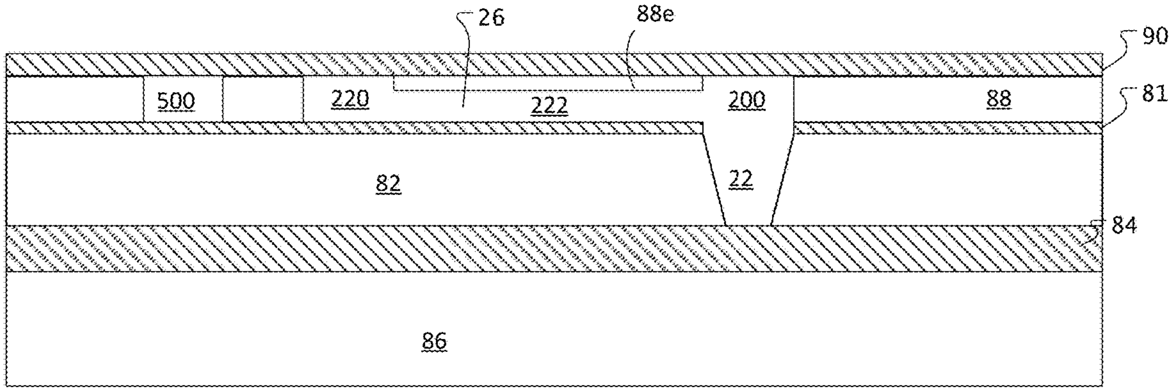

FIG. 18D proceeds similarly to FIG. 14C, with the first wafer 80 bonded to the second wafer 86 to form an assembly 98 and the opening 200 aligning to the nozzle 22. FIG. 18E proceeds similarly to FIG. 14D, in which the handle layer 92 is removed.

Figure 18F:
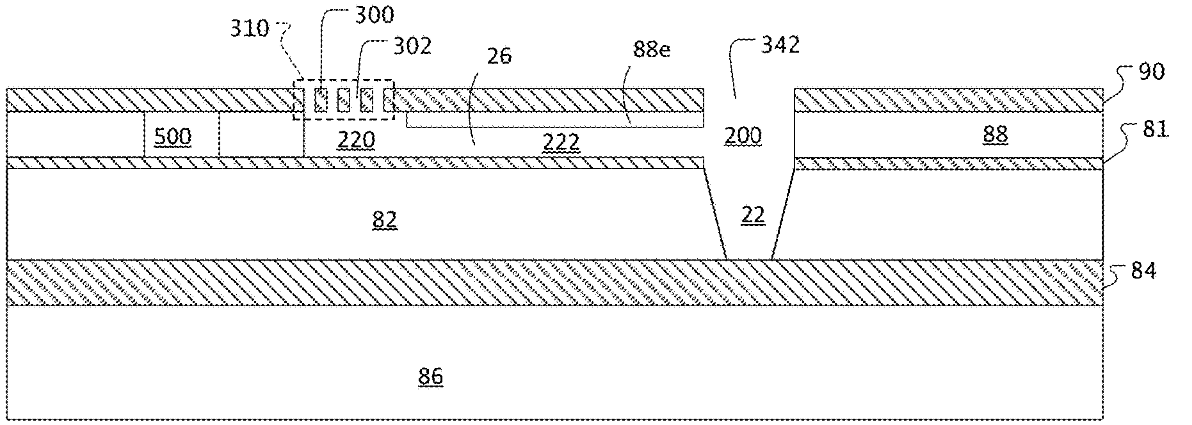

Referring to FIG. 18F, holes 302 are etched through the etch stop layer 90 until the recess 220 is reached to form the impedance feature 300. The holes 302 can be formed by an etching process such as wet etching or plasma etching. In particular, the holes 302 can be formed by an anisotropic etch, e.g., a reactive ion etch.

In addition, an aperture 342 can be formed through the etch stop layer 90 until the recess 200 is reached to provide an opening between the descender 20 and the nozzle 22.

The openings 302 and opening 342 can be formed simultaneously in a single etching step. In particular, the openings can be formed by an anisotropic etch, e.g., a reactive ion etch.

If the recess 220 did not extend entirely through the device layer 88, then a further etching step can be performed, e.g., using the etch stop layer 90 as a mask. Similarly, if the recess 200 did not extend entirely through the device layer 88, then a further etching step can be performed, e.g., using the etch stop layer 90 as a mask. Thus, openings 302 and 342 can be etched through the thin portion 88*e* of the device layer 88, e.g., by reactive ion etching, until the recess 208 is exposed.

Assuming that the recess 220 extends entirely through the device layer 88 as shown in FIG. 18F, then the portion of the etch stop layer 90 between the outlet passage 26 and the return channel 28 provides the membrane 300. On the other hand, if the recess 220 extends only partially through the device layer 88 (e.g., in a manner equivalent to what is shown in FIG. 16C), then the combination of the etch stop layer 90 and the thin portion 88*e* of the device layer 88 provides the membrane 300.

Figure 18G:
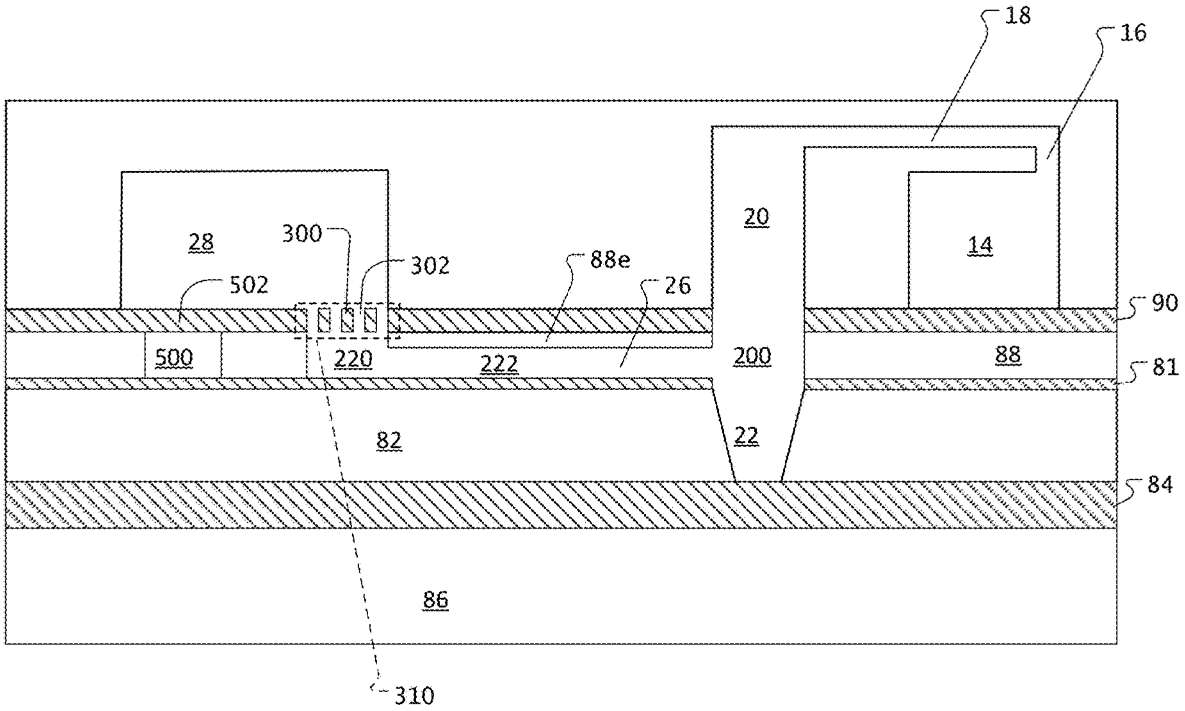

Referring to FIG. 18G, a top surface 74 of the assembly 96, e.g., the exposed surface of the etch stop layer 90, can be bonded to a flow path wafer 76. FIG. 18G proceeds similarly to FIG. 14F, but the flow path wafer 76 does not have any recess that defines the outlet passage 26, as it is defined entirely in the device layer 88.

Figure 18H:
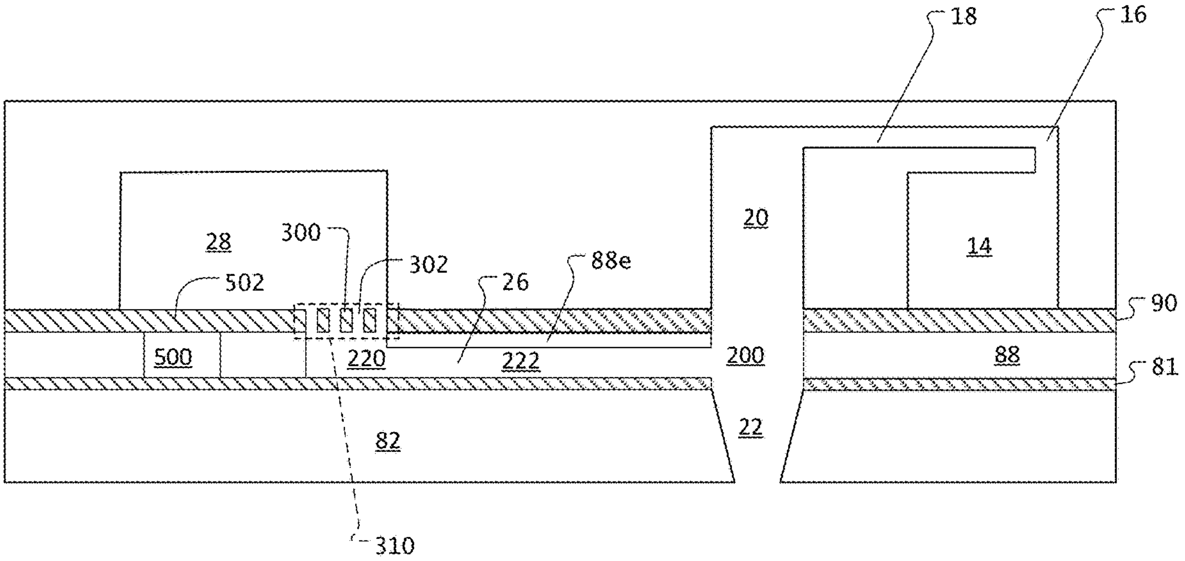

FIG. 18H proceeds similarly to FIG. 14G, in which the handle layer 85 and etch stop layer 84 are removed or the handle layer 85 is removed and apertures are formed through the etch stop layer 84 to complete the nozzles. After the actuator is formed or attached, the resulting substrate generally corresponds to the substrate shown in FIG. 3B.

Figure 10:
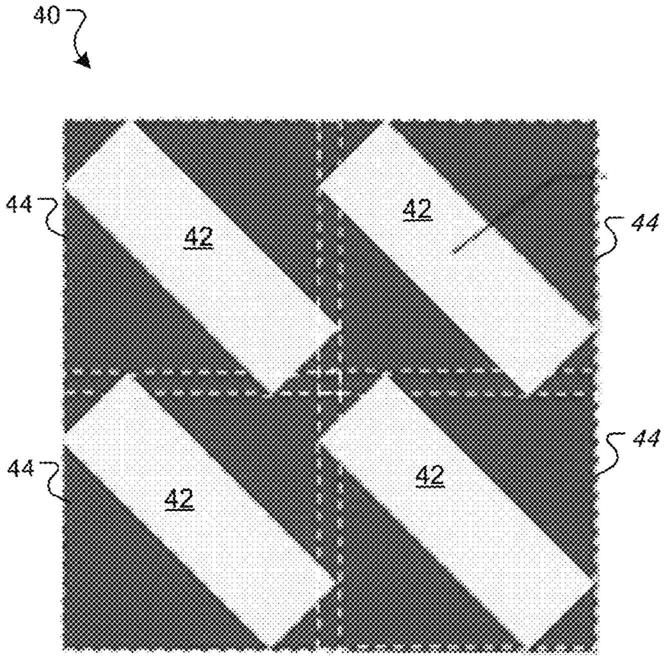
FIG. 10 is a top view of a mask.

Referring to FIG. 10, in some implementations, a mask 40 including multiple openings 42, e.g., rectangular openings, can be used to define the holes 302 of a desired size for the membrane 300. Each opening 42 corresponds to a cell region 44 defined by the corners of the opening 42, and the size and orientation of the openings 42 cause adjacent cell regions 44 to overlap. The area of each cell region 44 is approximately the square of the length of the long side 1 of the corresponding opening 42. With an anisotropic etch process (e.g., a potassium hydroxide etch process), correctly sized holes can be fabricated by continuing the anisotropic etch until a termination crystal plane (e.g., a <111> plane) is reached. For instance, the corners of each opening 42 can be positioned to expose a <111> plane, such that each opening 42 will cause the region defined by its corresponding cell region 44 to be etched. Since adjacent cell regions 44 overlap, the entire area can be opening by this etch process.

In some examples, a thick layer 82 can be used (e.g., 30 μm, 50 μm, or 100 μm thick). The use of a thick nozzle wafer minimizes the risk that the nozzle fabrication process will thin the nozzle wafer to an extent that the nozzle wafer is weakened.

The particular flow path configuration of the channel 14, inlet passage 16 and pumping chamber 18 that is common to the various implementations is merely one example of a flow path configuration. The approach for the filter feature or impedance feature described below can be used in many other flow path configurations. For example, if the supply channel 14 is located at the same level as the pumping chamber 18, then the ascender **16*a* is unnecessary. As another example, additional horizontal passages could be positioned between the pumping chamber 18 and the nozzle 22**. In general, discussion of the descender can be generalized to a first passage that connects a pumping chamber to an entrance of the nozzle, and discussion of the outlet passage can be generalized to a second passage that connects the entrance of the nozzle to the return channel.

Indications of the various elements as first or second, e.g., the first wafer and the second wafer, do not necessarily indicate the order in which the elements are fabricated. Although terms of positioning such as "above" and "below" are used, these terms are used to indicate relative positioning of elements within the system, and do not necessarily indicate position relative to gravity.

Particular embodiments have been described. Other embodiments are within the scope of the following claims.

What is claimed is:

1. A method of fabricating a fluid ejector comprising:

forming a nozzle in a nozzle layer, the nozzle layer having a first surface in which the nozzle has an exit opening for ejection of fluid;

forming a membrane on a second surface of the nozzle layer on a side of the nozzle layer farther from the first surface;

forming at least one hole through the membrane; and attaching a side of the membrane farther from the nozzle layer to a wafer having a pumping chamber and a return channel such that the at least one hole in the membrane provides a constriction in (i) a first passage between the pumping chamber and the nozzle or (ii) a second passage between the nozzle and the return channel.

2. The method of claim 1, in which an actuator is formed on the wafer, the actuator being configured such that actuation of the actuator causes fluid to flow out of the pumping chamber and be ejected from the nozzle.

3. The method of claim 2, in which the actuator comprises a piezoelectric actuator.

4. The method of claim 1, comprising forming the membrane and at least one hole to have a maximum impedance at or around a resonance frequency of the nozzle.

5. The method of claim 1, in which forming the at least one hole comprises etching the membrane.

6. The method of claim 1, comprising forming multiple holes in the membrane.

7. The method of claim 1, comprising forming the multiple holes such that the holes are spaced uniformly across the membrane.

8. The method of claim 1, in which forming the membrane comprises forming the membrane of an oxide.

9. The method of claim 8, comprising forming the membrane to have a thickness of between about 0.5 μm and about 5 μm.

10. The method of claim 1, in which forming the membrane comprises forming the membrane of a polymer.

11. The method of claim 10, comprising forming the membrane to have a thickness of between about 10 μm and about 30 μm.

12. The method of claim 1, in which forming the membrane comprises depositing a film on the nozzle layer.

13. The method of claim 1, comprising forming the membrane of a material that has a lower elastic modulus than a material of the wafer.

14. The method of claim 1, comprising forming the membrane such that the membrane extends substantially parallel to the first surface of the nozzle layer.

15. The method of claim 1, wherein forming the membrane comprises forming a first membrane, wherein the at least one hole in the first provides a constriction in the first passage between the pumping chamber and the nozzle; and in which the method comprises:

forming a second membrane having at least one hole therethrough; and attaching the second membrane to the wafer such that the at least one hole in the second membrane provides a construction in the second passage between the nozzle and the return channel.

* * * * *